United States Patent
Iketani

(10) Patent No.: US 8,358,868 B2
(45) Date of Patent: Jan. 22, 2013

(54) IMAGE PROCESSING APPARATUS, IMAGE PROCESSING METHOD, IMAGE EXTENDING APPARATUS, IMAGE COMPRESSING APPARATUS, IMAGE TRANSMITTING SYSTEM, AND STORAGE MEDIUM

(75) Inventor: Akihiko Iketani, Minato-ku (JP)

(73) Assignee: NEC Corporation, Tokyo (JP)

( * ) Notice: Subject to any disclaimer, the term of this patent is extended or adjusted under 35 U.S.C. 154(b) by 388 days.

(21) Appl. No.: 12/810,245

(22) PCT Filed: Dec. 10, 2008

(86) PCT No.: PCT/JP2008/003689
§ 371 (c)(1),
(2), (4) Date: Jun. 23, 2010

(87) PCT Pub. No.: WO2009/081529
PCT Pub. Date: Jul. 2, 2009

(65) Prior Publication Data
US 2010/0278422 A1    Nov. 4, 2010

(30) Foreign Application Priority Data
Dec. 25, 2007 (JP) .................. 2007-332029

(51) Int. Cl.
G06K 9/40 (2006.01)
G06K 9/48 (2006.01)
G06K 9/32 (2006.01)
G09G 5/00 (2006.01)
H04N 1/60 (2006.01)
H04N 1/40 (2006.01)
H04N 1/38 (2006.01)

(52) U.S. Cl. ........ 382/267; 382/199; 382/263; 382/266; 382/298; 348/606; 358/1.9; 358/447; 358/461; 358/463

(58) Field of Classification Search .................. None
See application file for complete search history.

(56) References Cited

U.S. PATENT DOCUMENTS
5,703,965 A * 12/1997 Fu et al. .................. 382/232
(Continued)

FOREIGN PATENT DOCUMENTS
JP    04-340672 A    11/1992
(Continued)

OTHER PUBLICATIONS

"Handbook of Image Analysis [Revised Edition]", First Edition, University of Tokyo Press, Sep. 10, 2004, pp. 728-732, pp. 1362-1367.

Primary Examiner — Randolph I Chu
(74) Attorney, Agent, or Firm — Sughrue Mion, PLLC

(57) ABSTRACT

Even when an enlarged image is deteriorated due to a block noise or color mixture, the contour in the enlarged image is sharpened and a quality of the image is improved. A contour extracting unit 103 determines a pixel indicating the contour in an interpolation image, using brightness gradient strength and a brightness gradient direction. A contour correcting unit 104 specifies a first isolation pixel isolated by the predetermined distance from each pixel indicating the contour in a brightness gradient direction of the pixel indicating the contour and a second isolation pixel isolated by the predetermined distance from each pixel in a 180°-rotation direction of the brightness gradient direction, for each pixel indicating the contour, corrects colors of the pixels between the pixel indicating the contour and the first isolation pixel with a color of the first isolation pixel, and corrects the colors of the pixels whose colors are not corrected with the color of the first isolation pixel among the pixels between the first isolation pixel and the second isolation pixel with a color of the second isolation pixel.

9 Claims, 30 Drawing Sheets

(a)

(b)

U.S. PATENT DOCUMENTS

| | | | |
|---|---|---|---|
| 6,714,688 B1* | 3/2004 | Gallagher et al. | 382/266 |
| 6,766,068 B2* | 7/2004 | Aoyama et al. | 382/300 |
| 7,391,920 B2* | 6/2008 | Abe | 382/266 |
| 7,894,675 B2* | 2/2011 | Wiedemann et al. | 382/199 |
| 8,249,357 B2* | 8/2012 | Yitzhaky et al. | 382/199 |
| 2002/0081031 A1* | 6/2002 | Suzuki | 382/194 |
| 2003/0099405 A1* | 5/2003 | Avinash et al. | 382/260 |
| 2003/0198399 A1* | 10/2003 | Atkins | 382/261 |
| 2003/0206667 A1* | 11/2003 | Wang et al. | 382/300 |
| 2004/0207881 A1* | 10/2004 | Nomura | 358/3.24 |
| 2005/0157940 A1* | 7/2005 | Hosoda et al. | 382/266 |
| 2006/0291741 A1 | 12/2006 | Gomi et al. | |

FOREIGN PATENT DOCUMENTS

| | | |
|---|---|---|
| JP | 11-161784 A | 6/1999 |
| JP | 2002-290773 A | 10/2002 |
| JP | 2006-221403 A | 8/2006 |

* cited by examiner

FIG. 4

(a)
$$\begin{matrix} -1 & 0 & 1 \\ -2 & 0 & 2 \\ -1 & 0 & 1 \end{matrix}$$

(b)
$$\begin{matrix} -1 & -2 & -1 \\ 0 & 0 & 0 \\ 1 & 2 & 1 \end{matrix}$$

FIG. 5

|   | l | m | n |   |
|---|---|---|---|---|
|   | o | p | q |   |
|   | r | s | t |   |

(a)  (b)

(a) 
COORDINATES (b) 
COORDINATES (c) 
COORDINATES (a)

(b)

IMAGE PROCESSING APPARATUS, IMAGE PROCESSING METHOD, IMAGE EXTENDING APPARATUS, IMAGE COMPRESSING APPARATUS, IMAGE TRANSMITTING SYSTEM, AND STORAGE MEDIUM

TECHNICAL FIELD

The present invention relates to an image processing apparatus, an image processing method, an image extending apparatus, an image compressing apparatus, an image transmitting system, and a storage medium. In particular, the present invention relates to an image processing apparatus and an image processing method that can improve a quality of an enlarged image, and an image compressing apparatus, an image extending apparatus, an image transmitting system, and a storage medium where the image processing apparatus is applied.

BACKGROUND ART

Various image enlarging methods have been suggested. In particular, a method that executes a filter process on an image after upsampling the image (or at the same time as an uplink) is well known. As a method that calculates increased brightness of a pixel by an interpolation to enlarge an image, a bilinear interpolation and a bicubic interpolation are known (for example, refer to Non-Patent Document 1). FIG. 27 illustrates an example of an image where a low-resolution image is upsampled with the double magnification in each of longitudinal and transverse directions. FIG. 28 illustrates an example of an image where brightness of a pixel in an enlarged image is interpolated by a bi-cubic interpolation.

In these methods, an image after the enlargement may blur. This is because a high-frequency component of the image is lost with enlargement of the image. For this reason, it is general to apply a contour enhancement process in order to compensate for the lost high-frequency component and restore the original contour.

An example of an image processing apparatus to enhance the contour is described in Patent Document 1. FIG. 29 is a block diagram illustrating the image processing apparatus that is described in Patent Document 1. As illustrated in FIG. 29, the image processing apparatus that is described in Patent Document 1 includes an analysis circuit 902 that has a contour component extracting circuit 901, a signal level detecting circuit 902, and a contour detecting circuit 904, a parameter calculating circuit 903, and a contour correcting circuit 905.

The analysis circuit 920 receives an input video signal Si and an input source determination signal Ssel. The input source determination signal Ssel is a signal indicating a kind of the input video signal Si. For example, when the input video signal Si is a video signal based on an HDTV (High Definition Television) scheme, a level of the input video signal Si becomes an H level (high level). Meanwhile, when the input video signal Si is a video signal based on an NTSC (National Television System Committee) scheme, the level of the input video signal Si becomes an L level (low level).

In the image processing apparatus, the contour component extracting circuit 901 extracts a contour component (also called an "edge component" or a "contour signal") Sa, which is a component corresponding to the contour in an image indicated by the input video signal Si, from the input video signal Si, according to the input source determination signal Ssel. The contour component extracting circuit 901 includes a high-pass filter. For example, the contour component extracting circuit 901 extracts a secondary differential component of the input video signal Si using a secondary differential filter and outputs the secondary differential component as the contour component Sa.

The signal level detecting circuit 902 detects a signal level of the input video signal Si and outputs a signal that has the detected signal level as a signal value.

The parameter calculating circuit 903 receives a first parameter αi, a second parameter βi, and a third parameter Di from the outside, and calculates an excessive enhancement correction threshold value α functioning as a first threshold value to suppress the contour from being excessively enhanced, a minute component enhancement threshold value β functioning as a second threshold value to enhance the contour of a minute image, and a contour detection threshold value D functioning as a third threshold value to detect the contour, based on the external parameters αi, βi, and Di.

The contour detecting circuit 904 compares the contour detection threshold value D and a value obtained by calculating a variation of the input video signal Si, and outputs a contour detection signal Sc indicating existence or non-existence of the contour, based on the comparison result.

The contour correcting circuit 905 uses the contour component Sa output from the contour component extracting circuit 901, the contour detection signal Sc output from the contour detecting circuit 904, the excessive enhancement correction threshold value α and the minute component enhancement threshold value β output from the parameter calculating circuit 903, and a coefficient γ externally given as a gain adjustment parameter, performs a signal process for performing contour enhancement on the input video signal Si, and generates an output video signal Sd as a signal process result.

In Non-Patent Document 1, an EM algorithm (Expectation Maximization algorithm) is described.

[Patent Document 1] Japanese Patent Application Laid-Open No. 2002-290773 (paragraphs 0041 to 0043, FIG. 1)
[Non-Patent Document 1] "Handbook of Image Analysis [Revised Edition]", first edition, University of Tokyo Press, Sep. 10, 2004, p. 728-732, p. 1362-1367

DISCLOSURE OF THE INVENTION

Even though the contour enhancement is applied to the enlarged image, the desired contour cannot be restored. This is because deterioration of an image quality, such as a block noise generated at the time of the image compression or mixture of plural adjacent colors with the contour as a boundary, occurs in a peripheral portion of the contour and the shape of the contour may change. FIG. 30 illustrates an image that indicates an example of a result obtained when the contour enhancement is applied to an enlarged image based on a bicubic interpolation. As exemplified in FIG. 30, even though a contour enhancement process is executed, an image where the contour is sufficiently sharpened is not obtained.

Accordingly, it is an object of the present invention to provide an image processing apparatus and an image processing method that can sharpen the contour in an enlarged image and improve a quality of an image, even when the enlarged image is deteriorated due to a block noise or color mixture, and an image compressing apparatus, an image extending apparatus, an image transmitting system, and a storage medium where the image processing apparatus is applied.

According to the present invention, there is provided an image processing apparatus including a brightness gradient calculating unit that calculates brightness gradient strength and a brightness gradient direction in each pixel of an interpolation image corresponding to an enlarged image including pixels inserted between pixels of an image before enlargement, a contour extracting unit that determines a pixel indicating the contour in said interpolation image, using said brightness gradient strength and said brightness gradient direction, and a contour correcting unit that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of said first isolation pixel among the pixels between said first isolation pixel and said second isolation pixel with a color of said second isolation pixel.

According to the present invention, there is provided an image compressing apparatus including a downsampling unit that downsamples an input image and generates a low-resolution image having resolution lower than resolution of said input image, an enlarged image generating unit that enlarges said low-resolution image, and an image subtracting unit that calculates differential data corresponding to the difference of pixel values between corresponding pixels of said input image and the image enlarged by said enlarged image generating unit, wherein said enlarged image generating unit includes an interpolation image generating unit that inserts pixels between pixels of an enlargement object image and generates an interpolation image where said enlargement object image is enlarged, a brightness gradient calculating unit that calculates brightness gradient strength and a brightness gradient direction in each pixel of the interpolation image, a contour extracting unit that determines a pixel indicating the contour in said interpolation image, using said brightness gradient strength and said brightness gradient direction, and a contour correcting unit that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of said first isolation pixel among the pixels between said first isolation pixel and said second isolation pixel with a color of said second isolation pixel.

According to the present invention, there is provided an image extending apparatus that receives a low-resolution image obtained by decreasing resolution of an original image and differential data corresponding to the difference of pixel values between corresponding pixels of said original image and said low-resolution image, and extends said low-resolution image, the image extending apparatus including an enlarged image generating unit that enlarges said low-resolution image, and an image adding unit that calculates a sum of pixel values of corresponding pixels of the image enlarged by said enlarged image generating unit and said differential data, wherein said enlarged image generating unit includes an interpolation image generating unit that inserts pixels between pixels of an enlargement object image and generates an interpolation image where said enlargement object image is enlarged, a brightness gradient calculating unit that calculates brightness gradient strength and a brightness gradient direction in each pixel of said interpolation image, a contour extracting unit that determines a pixel indicating the contour in said interpolation image, using said brightness gradient strength and said brightness gradient direction, and a contour correcting unit that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of the first isolation pixel among the pixels between said first isolation pixel and said second isolation pixel with a color of said second isolation pixel.

According to the present invention, there is provided an image transmitting system including an image compressing apparatus, and an image extending apparatus, wherein said image compressing apparatus includes a downsampling unit that downsamples an input image to generate a low-resolution image having resolution lower than resolution of said input image, and transmits said low-resolution image to said image extending apparatus, a first enlarged image generating unit that enlarges said low-resolution image, and an image subtracting unit that calculates differential data corresponding to the difference of pixel values between corresponding pixels of said input image and the image enlarged by said first enlarged image generating unit and transmits said differential data to said image extending apparatus, said image extending apparatus includes a second enlarged image generating unit that enlarges the low-resolution image received from said image compressing apparatus, and an image adding unit that calculates a sum of pixel values of corresponding pixels of the image enlarged by said second enlarged image generating unit and the differential data received from said image compressing apparatus, and each of said first enlarged image generating unit and said second enlarged image generating unit includes an interpolation image generating unit that inserts pixels between pixels of an enlargement object image and generates an interpolation image where said enlargement object image is enlarged, a brightness gradient calculating unit that calculates brightness gradient strength and a brightness gradient direction in each pixel of the interpolation image, a contour extracting unit that determines a pixel indicating the contour in said interpolation image, using said brightness gradient strength and said brightness gradient direction, and a contour correcting unit that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of said first isolation pixel among the pixels between said first isolation pixel and said second isolation pixel with a color of said second isolation pixel.

According to the present invention, there is provided an image processing method including, calculating a brightness gradient to calculate brightness gradient strength and a brightness gradient direction in each pixel of an interpolation image corresponding to an enlarged image including pixels inserted between pixels of an image before enlargement, extracting a contour to determine a pixel indicating the contour in said interpolation image, using said brightness gradient strength and said brightness gradient direction, and correcting a contour to specify a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, to correct colors of the pixels between the pixel indicating said contour and said first isolation pixel with a color of said first isolation pixel, and to correct the colors of the pixels whose colors are not corrected with said color of the first isolation pixel among the pixels between said first isolation pixel and said second isolation pixel with a color of said second isolation pixel.

According to the present invention, there is provided a storage medium that stores an image processing program to cause a computer to execute a brightness gradient calculating process that calculates brightness gradient strength and a brightness gradient direction in each pixel of an interpolation image corresponding to an enlarged image including pixels inserted between pixels of an image before enlargement, a contour extracting process that determines a pixel indicating the contour in said interpolation image, using said brightness gradient strength and said brightness gradient direction, and a contour correcting process that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of said first isolation pixel among the pixels between said first isolation pixel and said second isolation pixel with a color of said second isolation pixel.

According to the present invention, even when the enlarged image is deteriorated due to the block noise or the color mixture, the contour in the enlarged image can be sharpened and the quality of the image can be improved.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 4 is a diagram illustrating an example of a coefficient of a Sobel filter;

FIG. 5 is an image diagram illustrating a brightness value of each of pixels of n rows and n columns (3 rows and 3 columns) based on a brightness gradient calculation object pixel;

BEST MODE FOR CARRYING OUT THE INVENTION

Hereinafter, embodiments of the present invention will be described with reference to the drawings.

First Embodiment

Figure 1:
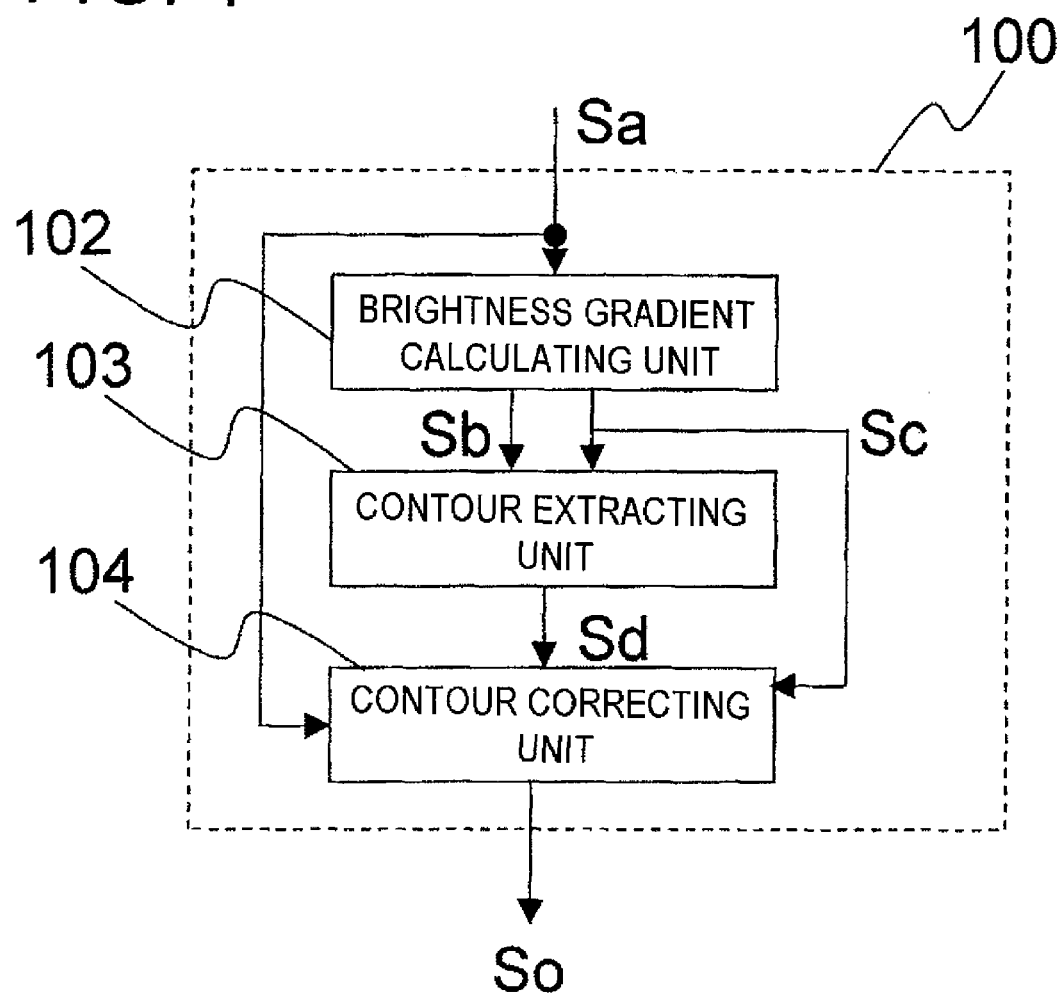
FIG. 1 is a block diagram illustrating an example of an image processing system according to a first embodiment of the present invention.

FIG. 1 is a block diagram illustrating an example of an image processing system according to the first embodiment of the present invention. The image processing system according to the first embodiment is realized by a computer 100 that is operated, for example, by controlling a program. The computer 100 is a computer that includes a central processing unit (processor, it may also be called a data processing device).

The computer 100 that becomes the image processing system includes a brightness gradient calculating unit 102, a contour extracting unit 103, and a contour correcting unit 104.

To the brightness gradient calculating unit 102, an image Sa (hereinafter, referred to as an interpolation image) that is enlarged by an interpolation process (for example, bilinear interpolation or bicubic interpolation) is input. The interpolation image Sa is an enlarged image that includes pixels inserted between pixels of the image before the enlargement. The brightness gradient calculating unit 102 calculates strength of a brightness gradient (hereinafter, simply referred to as brightness gradient strength) and a direction of the brightness gradient (hereinafter, simply referred to as brightness gradient direction), for each pixel of the interpolation image Sa. In this case, the case where an enlargement factor is constant from a low-resolution image (image before the enlargement) to the image after the enlargement is exemplified.

Figure 2:
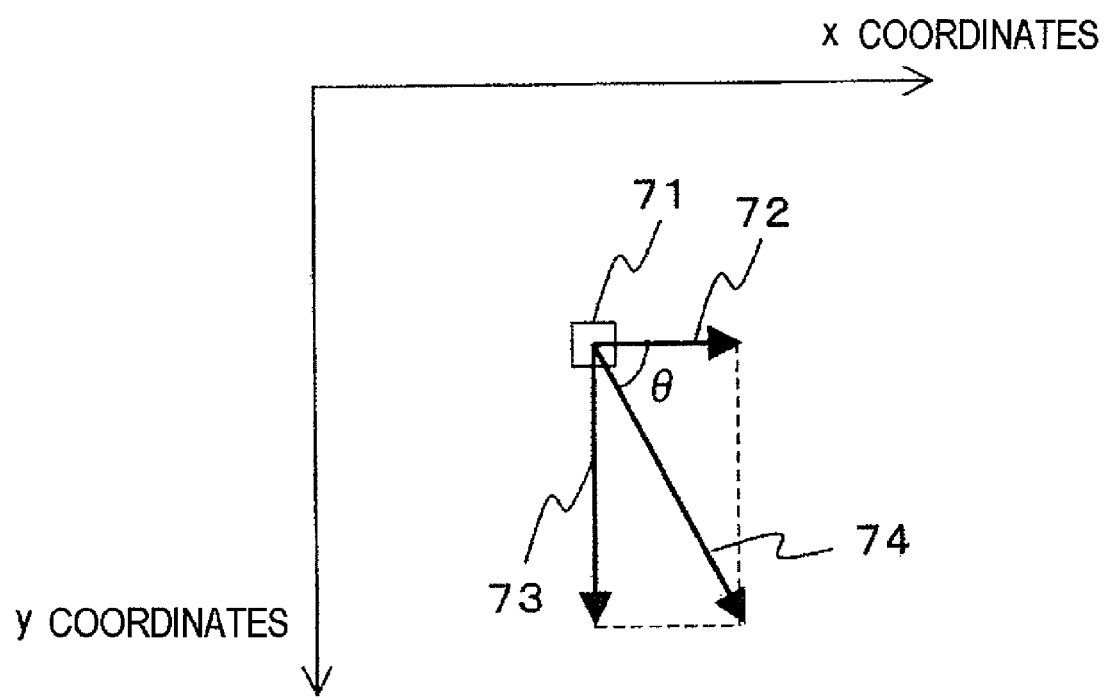
FIG. 2 is a diagram illustrating brightness gradient strength and a brightness gradient direction.

The brightness gradient is a value that indicates the amount by which the brightness of a pixel varies with respect to pixels around the corresponding pixel. For example, the brightness gradient is a variation in the brightness of the pixel of when the coordinates vary by 1. When the brightness gradient increases, the variation in the brightness increases. The brightness gradient is calculated for each of an x-axis direction (horizontal direction) and a y-axis direction (vertical direction). FIG. 2 is a diagram illustrating brightness gradient strength and a brightness gradient direction. In FIG. 2, the brightness gradient strength and the brightness gradient direction are described focusing on one pixel 71 of an image. However, brightness gradient strength and a brightness gradient direction are calculated by the same method as the above method, for each of the other pixels. A value that indicates a variation in the brightness in a horizontal direction in one pixel 71 is a brightness gradient of an x-axis direction in the pixel 71. A vector 72 that is illustrated in FIG. 2 is a vector that has the magnitude corresponding to the brightness gradient of the x-axis direction in the pixel 71 and is oriented in the x-axis direction. Hereinafter, the vector 72 is referred to as an x-axis direction brightness gradient vector. A value that indicates a variation in the brightness in a vertical direction in the pixel 71 is a brightness gradient of a y-axis direction in the pixel 71. A vector 73 that is illustrated in FIG. 2 is a vector that has the magnitude corresponding to the brightness gradient of the y-axis direction in the pixel 71 and is oriented in the y-axis direction. Hereinafter, the vector 73 is referred to as a y-axis direction brightness gradient vector. The brightness gradient strength in the pixel 71 is the magnitude of a synthesis vector 74 (refer to FIG. 2) of the x-axis direction brightness gradient vector 72 and the y-axis direction brightness gradient vector 73. The brightness gradient direction in the pixel 71 is an angle that is generated by a reference direction (specifically, x-axis direction) and a direction of the synthesis vector 74. In FIG. 2, the brightness gradient direction is displayed by "θ". The brightness gradient calculating unit 102 calculates brightness gradient strength (magnitude of the synthesis vector 74) and a brightness gradient direction (θ), for each pixel of the interpolation image Sa.

The contour extracting unit 103 determines a pixel indicating the original contour before being deteriorated, among pixels included in a supplementary image Sa, using the brightness gradient strength and the brightness gradient direction in each pixel. For example, the contour extracting unit 103 compares the brightness gradient strengths of adjacent pixels in the brightness gradient direction, based on a pixel (hereinafter, referred to as contour determination object pixel) becoming a determination object on whether the corresponding pixel is a pixel indicating the contour, and the brightness gradient strengths of adjacent pixels in an opposite direction thereof. The contour extracting unit 103 determines that the contour determination object pixel is a pixel on the contour (pixel indicating the contour), under the condition that the brightness gradient strength of the contour determination object pixel is more than a threshold value (contour extraction threshold value) and more than the brightness gradient strengths in the two adjacent pixels.

The contour correcting unit 104 estimates a representative color that represents each of two adjacent regions with the contour as a boundary and corrects a peripheral color of the contour based on the representative color. The contour correcting unit 104 specifies a pixel (hereinafter, referred to as first isolation pixel) that is isolated by the predetermined distance from the pixel indicating the contour (hereinafter, referred to as reference pixel) in a brightness gradient direction in the reference pixel. The contour correcting unit 104 corrects a color of each pixel existing on a straight line connecting the reference pixel and the first isolation pixel with a first representative color, using a color of the first isolation pixel as the first representative color. The contour correcting unit 104 specifies a pixel (hereinafter, referred to as second isolation pixel) that is isolated by the predetermined distance from the pixel (reference pixel) indicating the contour in a 180°-rotation direction of the brightness gradient direction in the reference pixel. The contour correcting unit 104 corrects a color of each pixel, of which the color is not corrected with the first representative color among pixels existing on a straight line connecting the first isolation pixel and the second isolation pixel, with the second representative color, using a color of the second isolation pixel as the second representative color. The contour correcting unit 104 executes this process for each pixel indicating the contour. In this case, the predetermined distance is assumed as the predetermined distance.

If the contour correcting unit 104 corrects the colors of the peripheral pixels of the pixel on the contour, a desired high-quality enlarged image can be obtained.

The brightness gradient calculating unit 102, the contour extracting unit 103, and the contour correcting unit 104 are realized by a central processing unit (CPU) that operates according to a program. That is, the central processing unit may read an image processing program from a storage device (not illustrated) that is included in the computer 100, and operate as the brightness gradient calculating unit 102, the contour extracting unit 103, and the contour correcting unit 104, according to the image processing program. Each of the brightness gradient calculating unit 102, the contour extracting unit 103, and the contour correcting unit 104 may be realized as an individual circuit.

Next, the operation will be described in detail.

Figure 3:
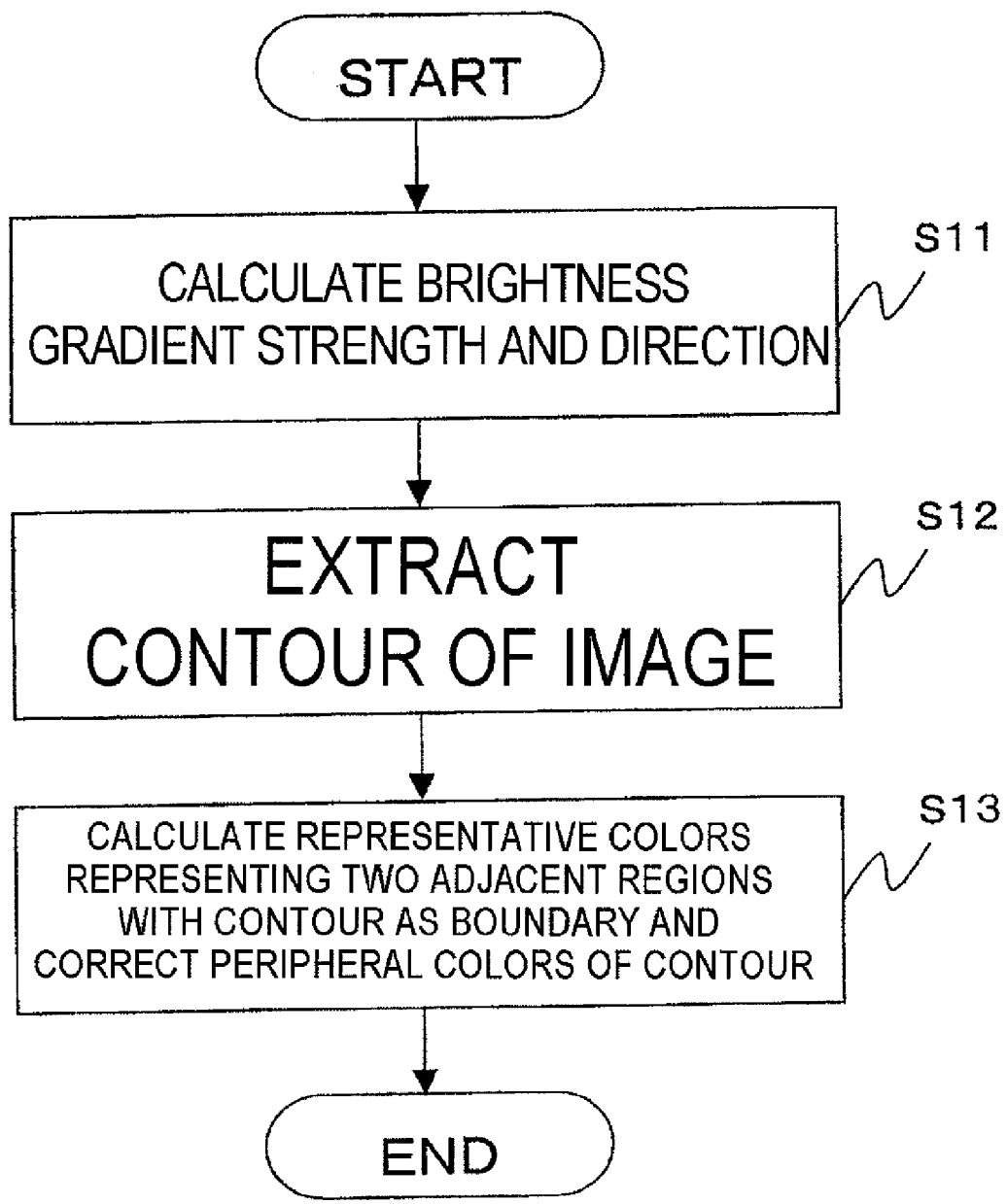
FIG. 3 is a flowchart illustrating an example of progression of a process of the first embodiment.
Figure 28:
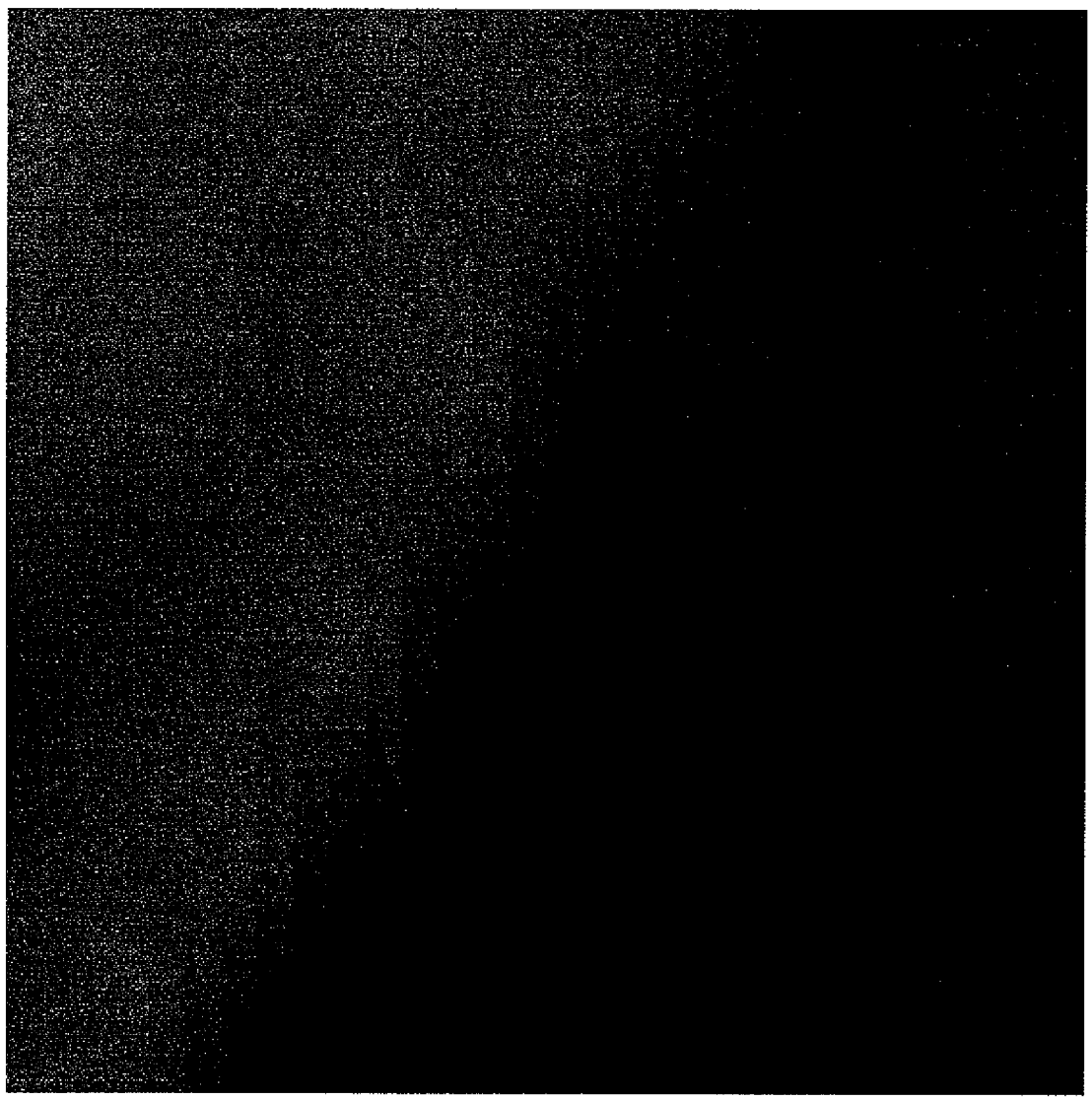
FIG. 28 is an image illustrating an example of a result of a bicubic interpolation.
Figure 29:
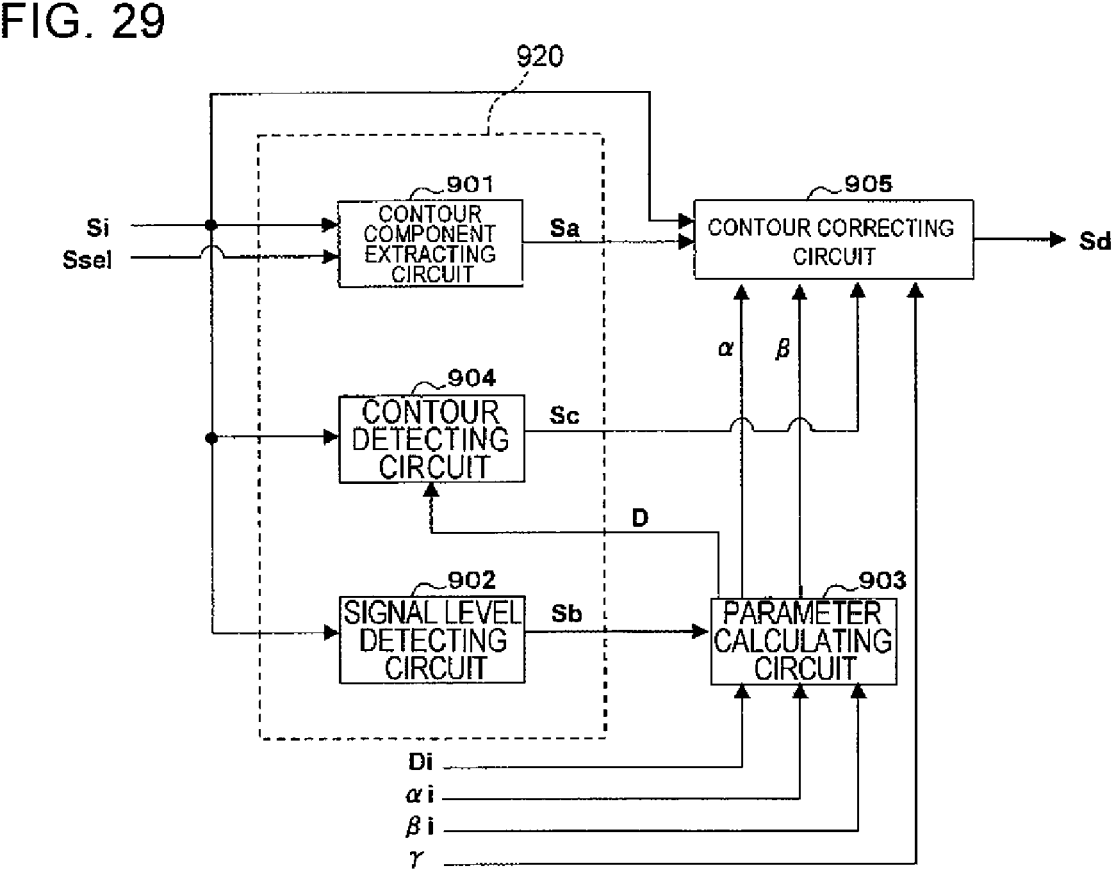
FIG. 29 is a block diagram illustrating an image processing apparatus that is described in Patent Document 1.
Figure 30:
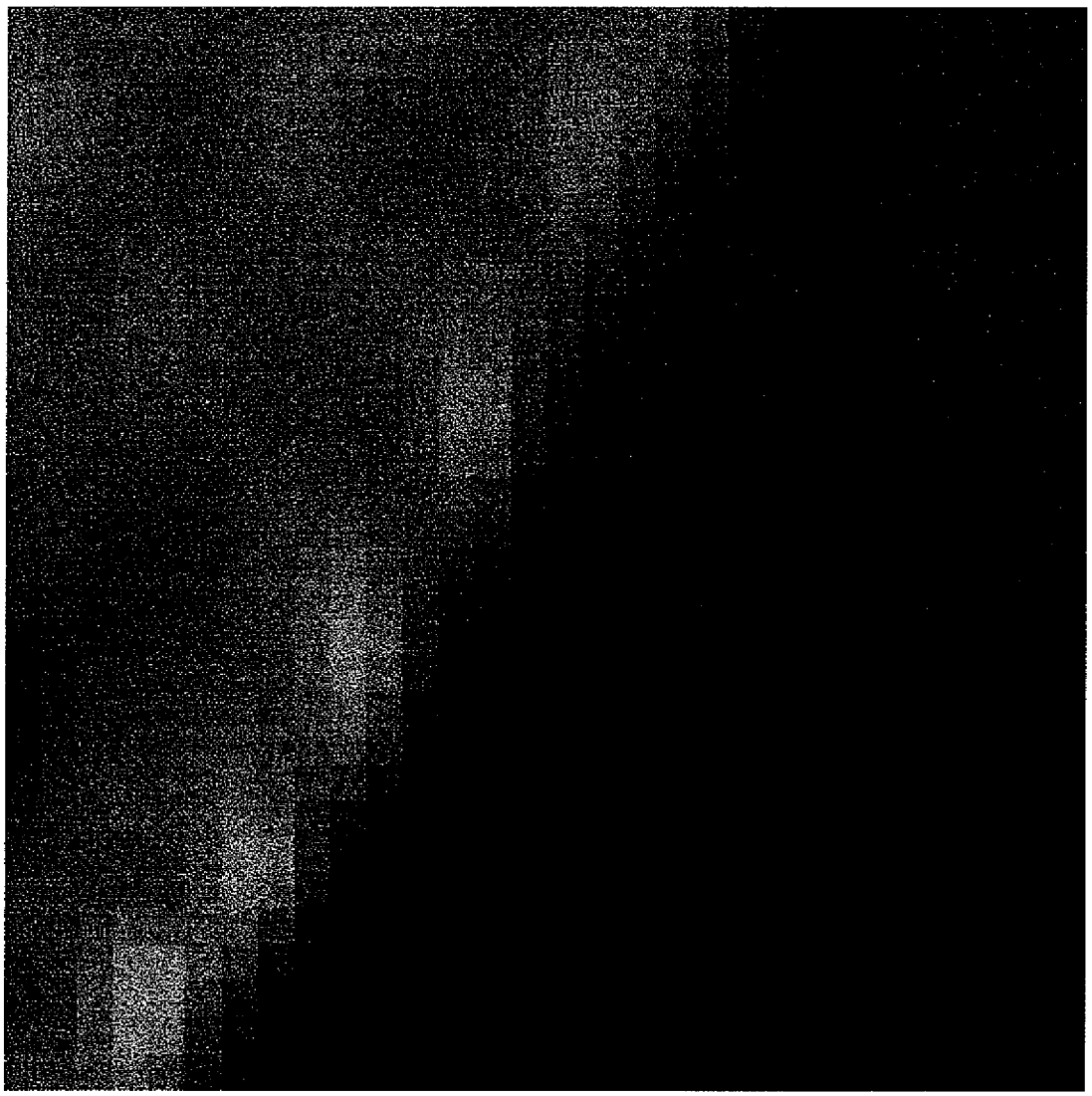
FIG. 30 is an image illustrating an example of a result of when contour enhancement is applied to an enlarged image based on a bicubic interpolation.

FIG. 3 is a flowchart illustrating an example of progression of a process of the first embodiment. To the image processing system, an interpolation image Sa (for example, an image exemplified in FIG. 28) enlarged by an interpolation process is input. The image processing system corrects colors (specifically, pixel values) of peripheral pixels of a contour portion in the interpolation image Sa and generates a high-quality image where the contour is clear.

In this embodiment, the interpolation image Sa is input to the brightness gradient calculating unit 102 and the contour correcting unit 104. If the interpolation image Sa is input, the brightness gradient calculating unit 102 calculates brightness gradient strength and a brightness gradient direction for each pixel of the interpolation image Sa and outputs the brightness gradient strength and the brightness gradient direction of each pixel to the contour extracting unit 103 (step S11). At this time, the brightness gradient calculating unit 102 also outputs the brightness gradient direction of each pixel to the contour correcting unit 104. Hereinafter, the brightness gradient strength is represented as Sb and the brightness gradient direction is represented as Sc. The brightness gradient strength Sb and the brightness gradient direction Sc may be displayed by specify the coordinates. That is, the brightness gradient strength at the coordinates (x, y) is represented as Sb(x, y) and the brightness gradient direction Sc at the coordinates (x, y) may be represented as Sc(x, y).

In step S11, first, the brightness gradient calculating unit 102 specifies a brightness value from a pixel value, for each pixel. The pixel value is a value that is set to each pixel of an input image. For example, when the pixel is displayed in an RGB format, the pixel value of each pixel is a value that indicates a contrasting density of each of R, G, and B. The brightness value is a value that indicates the magnitude of the brightness. For example, it is assumed that each pixel is displayed in the RGB format. In this case, the brightness gradient calculating unit 102 may perform calculation of the following Equation 1 for each pixel and calculate a brightness value of each pixel.

$$Y(x, y) = 0.299 \cdot R(x, y) + 0.587 \cdot G(x, y) + 0.144 \cdot B \qquad \text{Equation (1)}$$

In Equation 1, Y(x, y) is a brightness value of a pixel at the coordinates (x, y). Further, R(x, y), G(x, y), and B(x, y) are pixel values of R, G, and B in the pixel at the coordinates (x, y), respectively.

In step S11, the brightness gradient calculating unit 102 calculates brightness gradient strength and a brightness gradient direction from a brightness value of each pixel. An example of a process where the brightness gradient calculating unit 102 calculates the brightness gradient strength and the brightness gradient direction is described. As a calculation process of the brightness gradient strength and the brightness gradient direction, for example, a method using an edge detection operator is known. In the method using the edge detection operator, values (coefficients) that are arranged in n rows ×n columns determined in advance and pixels of n rows and n columns included in an image are made to correspond to each other, and products of the coefficients and the brightness values of the pixels corresponding to each other are calculated, a sum thereof is calculated, and the brightness gradient is calculated. The coefficients that are used in the calculation are called coefficients of the edge detection operator. Examples of the edge detection operator include a Sobel filter, an operator of Robinson, and an operator of Prewitt. Hereinafter, the case where the brightness gradient is calculated using the coefficient of the Sobel filter is exemplified. However, a process of the case using a coefficient of another edge detection operator (coefficient of the operator of Robinson or efficient of the operator of Prewitt) is the same as that of the above case.

The coefficients of the Sobel filter are predetermined as an arrangement of numerals of n rows and n columns where predetermined numerals are arranged, such as 3 rows and 3 columns, 5 rows and 5 columns, and 7 rows and 7 columns. In this case, n is an odd number. As the coefficients of the Sobel filter, two kinds of coefficients that include coefficients used to calculate the brightness gradient of a horizontal direction and coefficients used to calculate the brightness gradient of a vertical direction are determined. FIG. 4 is a diagram illustrating an example of the coefficients of the Sobel filter. Hereinafter, the case where the coefficients of the Sobel filter are an arrangement of numerals of 3 rows and 3 columns is exemplified. FIG. 4(*a*) illustrates coefficients of the Sobel filter (hereinafter, referred to as a horizontal direction Sobel filter) that are used to calculate the brightness gradient of a horizontal direction (x-axis direction). FIG. 4(*b*) illustrates coefficients of the Sobel filter (hereinafter, referred to as a vertical direction Sobel filter) that are used to calculate the brightness gradient of a vertical direction (y-axis direction).

The brightness gradient calculating unit 102 convolutes the horizontal direction Sobel filter to each brightness value of the interpolation image Sa and generates a brightness gradient image Dh of the horizontal direction. The brightness gradient calculating unit 102 convolutes the vertical direction Sobel filter to the interpolation image Sa and generates a brightness gradient image Dv of the vertical direction. The brightness gradient image Dh of the horizontal direction is an image where the brightness gradient of the horizontal direction (x-axis direction) of the corresponding pixel in the interpolation image Sa is allocated to each pixel. The brightness gradient image Dv of the vertical direction is an image where the brightness gradient of the vertical direction (y-axis direction) of the corresponding pixel in the interpolation image Sa is allocated to each pixel.

Figure 5:
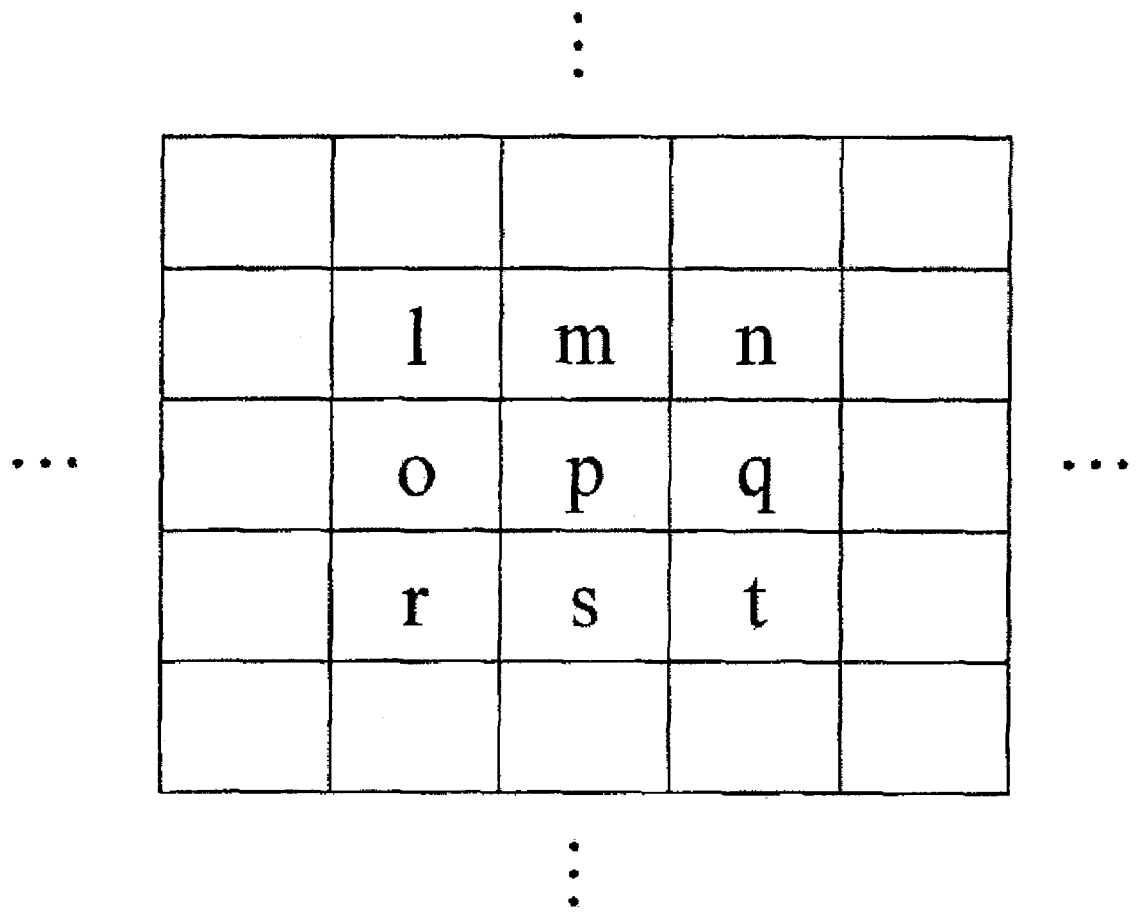

The convolution of the Sobel filter is a process of specifying plural pixels having the same arrangement as that of the coefficients of the Sobel filter based on the calculation object pixel of the brightness gradient, calculating products with the coefficients of the Sobel filter for the individual pixels, and calculating a sum of the products. In this case, since the case where the coefficients of the Sobel filter is an arrangement of numerals of 3 rows and 3 columns is exemplified, the brightness gradient calculating unit 102 specifies the pixels of 3 rows and 3 columns based on the calculation object pixel of the brightness gradient. FIG. 5 is an image diagram illustrating a brightness value of each of pixels of n rows and n columns (3 rows and 3 columns) based on a brightness gradient calculation object pixel. If the brightness gradient calculating unit 102 specifies nine pixels having brightness values i to t exemplified in FIG. 5, the brightness gradient calculating unit 102 calculates a product of the brightness value and the corresponding coefficient of the Sobel filter, for each of the plural pixels. The calculation object pixel that is located at the center of the specified pixels of n rows and n columns corresponds to the coefficient arranged at the center of the coefficients of the Sobel filter of n rows and n columns. When the positions of the pixels based on the calculation object pixel become the same positions as the positions of the coefficients based on the coefficient arranged at the center of the coefficients of the Sobel filter, it is assumed that the pixels and the coefficients correspond to each other. For example, the pixel having the brightness value q that is exemplified in FIG. 5 corresponds to a coefficient "2" of the Sobel filter illustrated in FIG. 4(*a*). The brightness gradient calculating unit 102 calculates products of the coefficients of the Sobel filter and the brightness values of the pixels corresponding to each other and calculates a sum thereof.

As illustrated in FIGS. 4(*a*) and (*b*), since the coefficients of the Sobel filter are two kinds of coefficients in the horizontal direction and the vertical direction, the brightness gradient calculating unit 102 performs the calculation using each of the horizontal direction Sobel filter and the vertical direction Sobel filter. The individual coefficients that are included in the arrangement of the coefficients of the horizontal direction Sobel filter are represented as Sobelh(i, j). In this case, i indicates a column in the arrangement of the coefficients and has values of −1, 0, and 1, and j indicates a row in the arrangement of the coefficients and has values of −1, 0, and 1. A brightness value of the pixel at the coordinates (x, y) in the interpolation image Sa is represented as Sa(x, y). At this time, if the brightness gradient calculating unit 102 performs calculation of the following Equation 2 as the calculation of the product and the sum, the brightness gradient calculating unit 102 can calculate the brightness gradient Dh(x, y) of the horizontal direction in the pixel at the coordinates (x, y).

$$Dh(x, y) = \sum_{-1 \leq i \leq 1} \sum_{-1 \leq j \leq 1} (Sobelh(i, j) \times Sa(x + i, y + j)) \quad \text{Equation (2)}$$

Further, it is assumed that the individual coefficients included in the arrangement of the coefficients of the vertical direction Sobel filter are represented as Sobelv(i, j). At this time, if the brightness gradient calculating unit 102 performs calculation of the following Equation 3 as the calculation of the product and the sum, the brightness gradient calculating unit 102 can calculate the brightness gradient Dv(x, y) of the vertical direction in the pixel at the coordinates (x, y).

$$Dv(x, y) = \sum_{-1 \leq i \leq 1} \sum_{-1 \leq j \leq 1} (Sobelv(i, j) \times Sa(x + i, y + j)) \quad \text{Equation (3)}$$

The brightness gradient calculating unit 102 calculates the brightness gradients of the horizontal direction and the vertical direction for each pixel of the interpolation image Sa. The brightness gradient calculating unit 102 calculates the brightness gradient strength and the brightness gradient direction for each pixel, using the brightness gradients of the horizontal direction and the vertical direction.

The brightness gradient strength Sb(x, y) at the coordinates (x, y) is the magnitude of a synthesis vector 74 of an x-axis direction brightness gradient vector 72 and a y-axis direction brightness gradient vector 73 (refer to FIG. 2). The brightness gradient calculating unit 102 calculates the magnitude (brightness gradient strength Sb(x, y)) of the vector. The brightness gradient calculating unit 102 may calculate the brightness gradient strength Sb(x, y) through calculation of the following Equation 4.

$$Sb(x, y) = abs(Dh(x, y)) + abs(Dv(x, y)) \quad \text{Equation (4)}$$

Equation 4 is an approximate expression that calculates the magnitude of the synthesis vector. The brightness gradient calculating unit 102 may calculate the brightness gradient strength Sb(x, y) through calculation of the following Equation 5, instead of the calculation of the approximate expression of Equation 4.

$$Sb(x, y) = \sqrt{(Dh(x, y)^2 + Dv(x, y)^2)} \quad \text{Equation (5)}$$

The brightness gradient calculating unit 102 may calculate the brightness gradient direction Sc(x, y) of the coordinates (x, y) through calculation of the following Equation 6.

$$Sc(x, y) = \tan^{-1}(Dv(x, y)/Dh(x, y)) \quad \text{Equation (6)}$$

The brightness gradient calculating unit 102 may quantize the calculated brightness gradient strength Sb and brightness gradient direction Sc in an appropriate step. That is, the brightness gradient calculating unit 102 may transform the calculated brightness gradient strength and brightness gradient direction to represent the calculated brightness gradient strength and brightness gradient direction with a smaller bit number. For example, when the calculated brightness gradient strength is represented with 8 bits, the brightness gradient calculating unit 102 may transform the calculated brightness gradient strength to represent the calculated brightness gradient strength with 3 bits. When the brightness gradient calculating unit 102 transforms 8 bits into 3 bits, the brightness gradient calculating unit 102 may divide the brightness gradient strength represented with 8 bits by 16 and may round the numbers off to the closest whole number.

Figure 6:
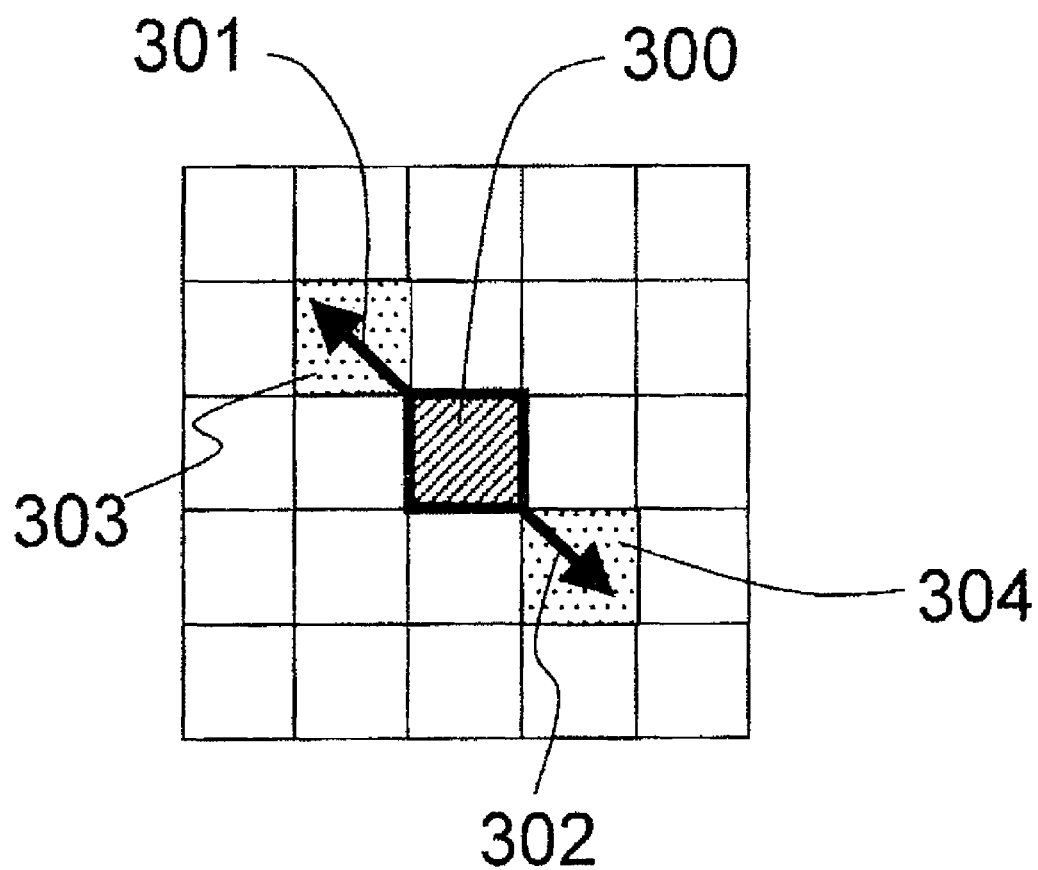
FIG. 6 is a diagram illustrating an example of a determination process of a pixel indicating the contour.

Next, the contour extracting unit 103 determines a pixel indicating the contour in the interpolation image Sa, using the brightness gradient strength Sb and the brightness gradient direction Sc of each pixel calculated by the brightness gradient calculating unit 102 and a contour extraction threshold value Pc (step S12). In this case, the contour extraction threshold value Pc is assumed as the predetermined value. FIG. 6 is a diagram illustrating an example of a determination process of a pixel indicating the contour. A pixel 300 that is illustrated in FIG. 6 is a contour determination object pixel. A direction 301 that is illustrated in FIG. 6 indicates a brightness gradient direction Sc(x, y) of the contour determination object pixel 300. A direction 302 that is illustrated in FIG. 6 indicates a direction (Sc(x, y)+π) of when the brightness gradient direction 302 of the contour determination object pixel rotates by n radians (180°). When the brightness gradient strength of the contour determination object pixel 300 is more than the contour extraction threshold value Pc and more than the brightness gradient strength of an adjacent pixel 303 of the contour determination object pixel in the brightness gradient direction 301 and the brightness gradient strength of an adjacent pixel 304 in the direction 302 of when the brightness gradient direction 301 rotates by 180°, the contour extracting unit 103 determines that the contour determination object pixel 300 is the pixel indicating the contour. Meanwhile, when the brightness gradient strength of the contour determination object pixel 300 is not more than the contour extraction threshold value Pc, the contour extracting unit 103 determines that the contour determination object pixel 300 is not the pixel indicating the contour. Even when the condition that the brightness gradient strength of the contour determination object pixel 300 is more than the brightness gradient strength of the adjacent pixel 303 of the contour determination object pixel in the brightness gradient direction 301 and the brightness gradient strength of the adjacent pixel 304 in the direction 302 of when the brightness gradient direction 301 rotates by 180° is not satisfied, the contour extracting unit 103 determines that the contour determination object pixel 300 is not the pixel indicating the contour. The contour extracting unit 103 performs the determination for each pixel. The determination processing method of the pixel on the contour is not limited to the above method, and the contour extracting unit 103 may determine the pixel on the contour using another method.

The contour extracting unit 103 stores a pixel value other than 0 with respect to the pixel determined as the pixel indicating the contour, and outputs an image (hereinafter, referred to as contour image Sd) where a pixel value "0" is stored with respect to the other pixels to the contour correcting unit 104. From the contour image Sd, the contour correcting unit 104 can distinguish the pixel determined as the pixel indicating the contour and the other pixels. The contour extracting unit 103 may output a coordinate value of the pixel determined as the pixel indicating the contour to the contour correcting unit 104. The contour extracting unit 103 may output the pixel determined as the pixel indicating the contour to the contour correcting unit 104 to distinguish the pixel determined as the pixel indicating the contour and the other pixels.

Figure 7:
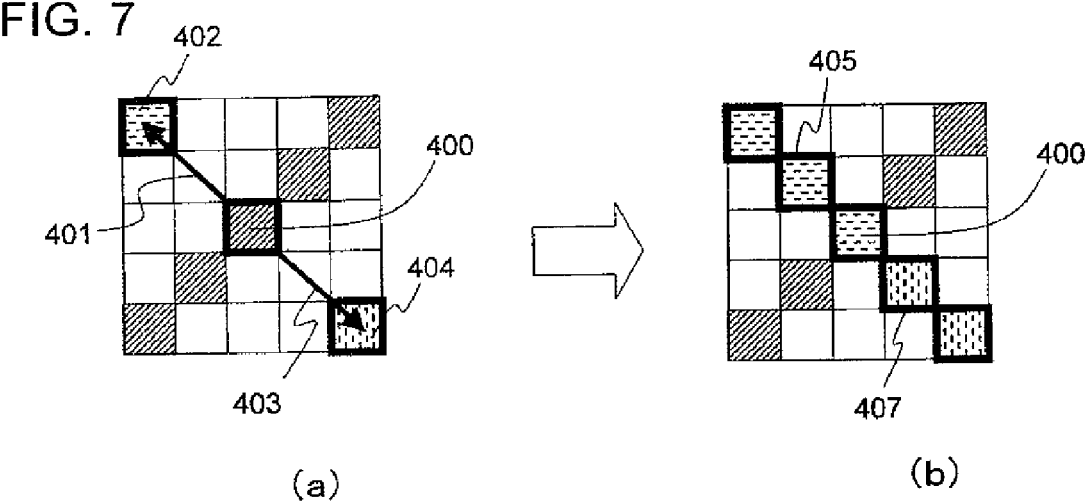
FIG. 7 is a diagram illustrating an example of a correction process of peripheral pixels of the contour.

After step S12, the contour correcting unit 104 determines a representative color that represents each of two adjacent regions with the contour as a boundary and corrects peripheral pixel values of the contour in the interpolation image Sa (step S13). FIG. 7 is a diagram illustrating an example of a correction process of the peripheral pixels of the contour. FIG. 7(a) illustrates an interpolation image before the correction and FIG. 7(b) illustrates an interpolation image after the correction. Pixels that are illustrated by slant lines in FIG. 7(a) are pixels that are determined as the pixels indicating the contour and combining of the pixels becomes the contour of the image. In step S13, the contour correcting unit 104 selects one of the pixels (reference pixels) that are determined as the pixels indicating the contour by the contour extracting unit 103. A pixel 400 that is illustrated in FIG. 7 indicates the reference pixel. A direction 401 that is illustrated in FIG. 7 indicates a brightness gradient direction Sc(x, y) of the reference pixel 400. A direction 403 that is illustrated in FIG. 7 indicates a direction (Sc(x, y)+π) of when the brightness gradient direction 401 of the reference pixel rotates by π radians (180°).

The contour correcting unit 104 specifies a first isolation pixel 402 that is isolated by the predetermined distance from the reference pixel 400 in the brightness gradient direction in the reference pixel 400. The contour correcting unit 104 sets a color of the first isolation pixel 402 of the interpolation image Sa as the first representative color. The contour correcting unit 104 corrects a color of each pixel existing on a straight line connecting the reference pixel 400 and the first isolation pixel 402 with the same color as the first representative color. That is, the contour correcting unit 104 replaces a pixel value of each pixel existing on a straight line connecting the reference pixel 400 and the first isolation pixel 402 by a pixel value of the first isolation pixel 402. For example, when each pixel of the interpolation image Sa is represented in an RGB format, the contour correcting unit 104 may replace the pixel value by a value of each of R, G, and B of the first isolation pixel 402. The contour correcting unit 104 also replaces the pixel value of the reference pixel 400 by the pixel value of the first isolation pixel 402.

Likewise, the contour correcting unit 104 specifies a second isolation pixel 404 that is isolated by the predetermined distance from the reference pixel 400 in the direction 403 (refer to FIG. 7(a), this direction is a 180°-inversion direction of the brightness gradient direction 401). The contour correcting unit 104 sets a color of the second isolation pixel 404 of the interpolation image Sa as the second representative color. The contour correcting unit 104 replaces a pixel value of the pixel, of which the pixel value is not replaced by the pixel value of the first isolation pixel 402 among the pixels existing on a straight line connecting the second isolation pixel 404 and the first isolation pixel 402, by the pixel value of the second isolation pixel 404.

As a process result, as illustrated in FIG. 7(b), the colors of the reference pixel 400 and the pixel 405 are corrected with the first representative color and the color of the pixel 407 is corrected with the second representative color. Here, the case where the pixel value of the reference pixel 400 is replaced by the pixel value of the first isolation pixel 402 is exemplified, but the pixel value of the reference pixel 400 may be replaced by the pixel value of the second isolation pixel 404.

Figure 8:
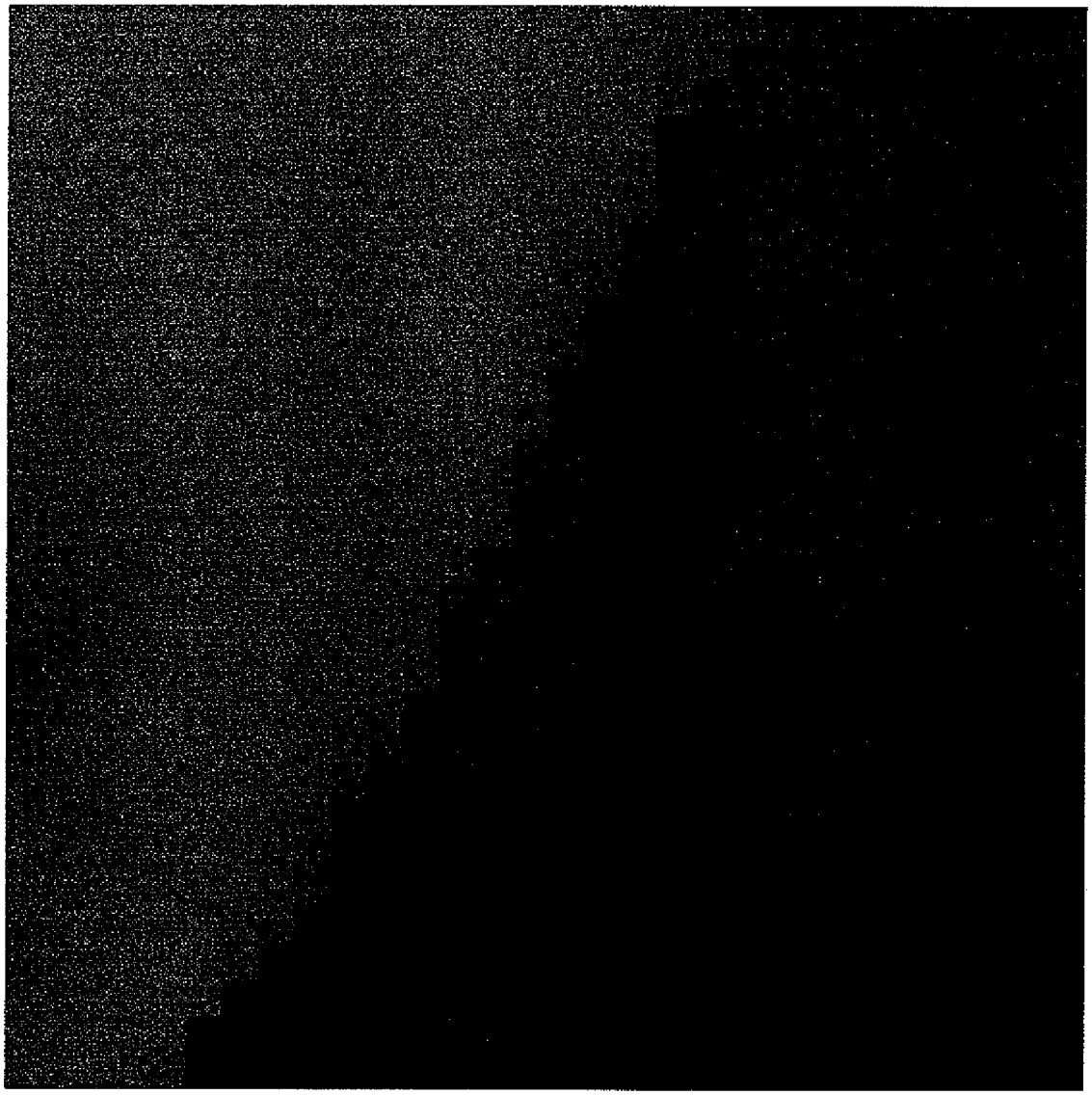
FIG. 8 is an image illustrating an example of a correction process result by a contour correcting unit.

The contour correcting unit 104 sequentially selects all of the pixels determined as the pixels indicating the contour by the contour extracting unit 103, repeats the above process, and corrects the peripheral pixel values of the contour. The contour correcting unit 104 outputs an image after the correction. An example of an enlarged image that is generated by the correction process executed by the contour correcting unit 104 is illustrated in FIG. 8. As illustrated in FIG. 8, a high-quality image where the contour is clear is obtained.

Next, an effect of this embodiment will be described.

In this embodiment, the contour extracting unit 103 specifies the pixel on the contour of the image and the contour correcting unit 104 corrects the pixel values of the pixels to distinguish the individual pixels between the first isolation pixel and the second isolation pixel with the pixel on the contour therebetween, using the two representative colors. For this reason, a high-quality enlarged image where the contour is clear can be generated. Since the pixels that are isolated by the predetermined distance from the reference pixel are specified as the first isolation pixel and the second isolation pixel, the colors that are not affected by color mixture can be used as the representative colors, and a high-quality enlarged image can be generated.

Figure 9:
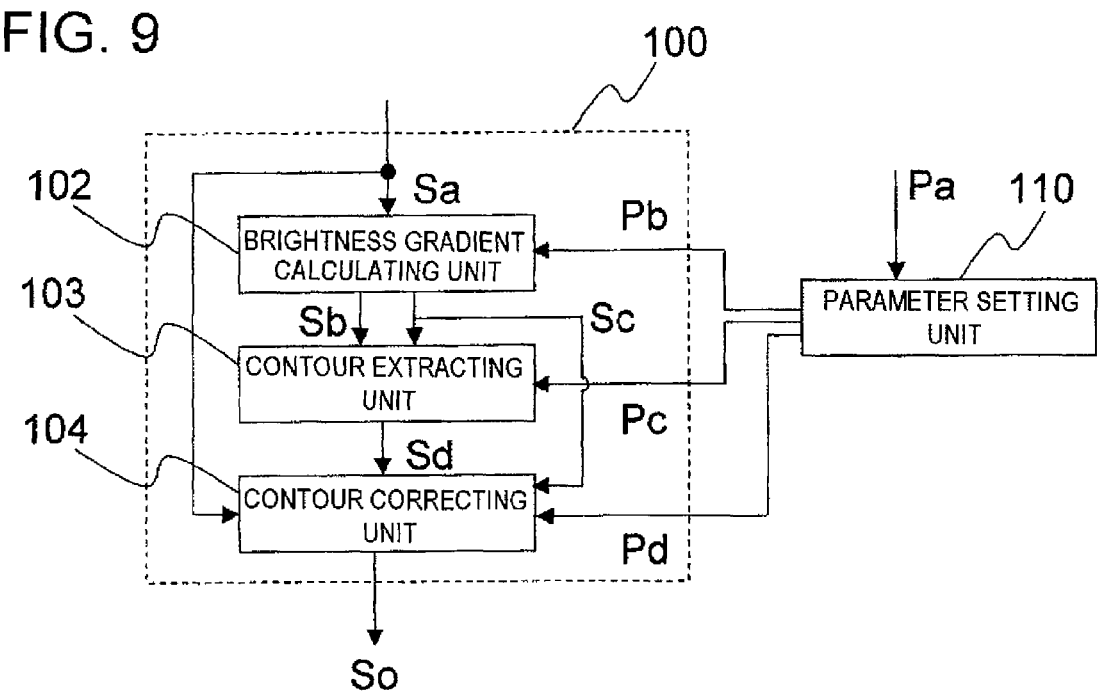
FIG. 9 is a block diagram illustrating a modification of the first embodiment.

Next, a modification of the first embodiment will be described. In the first embodiment, the case where the coefficients of the Sobel filter are fixed to n rows and n columns (for example, 3 rows and 3 columns) and the contour extraction threshold value Pc is a predetermined constant is exemplified. In step S13, the predetermined distance that is used when the first isolation pixel 402 and the second isolation pixel 404 (refer to FIG. 7(a)) are specified is also predetermined. In the modification of the first embodiment to be described below, these values vary. FIG. 9 is a block diagram illustrating the modification of the first embodiment. In this case, the same components as the components described above are denoted by the same reference numerals as those of FIG. 1. As illustrated in FIG. 9, an image processing system may include a parameter setting unit 110 in addition to the brightness gradient calculating unit 102, the contour extracting unit 103, and the contour correcting unit 104. In FIG. 9, the case where the parameter setting unit 110 is provided separately from the computer 100 is exemplified. However, the computer 100 may include the parameter setting unit 110. The parameter setting unit 110 may be realized by a central processing unit that operates according to a program. That is, the central processing unit may read an image processing program and operate as the parameter setting unit 110, the brightness gradient calculating unit 102, the contour extracting unit 103, and the contour correcting unit 104, according to the image processing program.

In the modification of the first embodiment, the number of coefficients that are arranged in n rows and n columns as the coefficients of the Sobel filter is variable. That is, "n" of n rows and n columns is variable and the coefficients of the Sobel filter, such as 3 rows and 3 columns and 5 rows and 5 columns, can be selected. The parameter setting unit 110 calculates a parameter to determine numbers of rows and columns of coefficients that the brightness gradient calculating unit 102 selects as the coefficients of the Sobel filter, and outputs the parameter to the brightness gradient calculating unit 102. Hereinafter, this parameter is referred to as a brightness gradient calculating parameter and is represented as "Pb". The brightness gradient calculating unit 102 previously holds the coefficients of the Sobel filter according to numbers of rows and columns, such as 3 rows and 3 columns, 5 rows and 5 columns, and 7 rows and 7 columns, selects the coefficients of the Sobel filter of numbers of rows and columns according to the brightness gradient calculating parameter Pb, and executes a process of Step S11.

The parameter setting unit 110 calculates the contour extraction threshold value Pc and outputs the contour extraction threshold value to the contour extracting unit 103. The contour extracting unit 103 executes a process of step S12 using the contour extraction threshold value Pc calculated by the parameter setting unit 110.

In step S13, the parameter setting unit 110 calculates the distance to determine the first and second isolation pixels from the reference pixel and outputs the distance to the contour correcting unit 104. The distance is referred to as a contour correcting parameter and is represented as "Pd".

When the contour correcting unit 104 determines the first and second isolation pixels in step S13, the contour correcting unit 104 determines the first and second isolation pixels as the pixels isolated from the reference pixel by the distance indicated by the contour correcting parameter Pd.

In this case, meanings of the values of "n (n indicating a column number and a row number)" indicating the magnitude of the arrangement of the coefficients of the Sobel filter, the contour extraction threshold value Pc, and the contour correcting parameter Pd will be described.

The coefficients of the Sobel filter are an arrangement of numerals of n rows and n columns. However, when n is small, a large brightness gradient is calculated with respect to undulation of brightness in a narrow range. That is, if the value of n is decreased, even when slight undulation of brightness in the narrow range is generated, it is likely to determine a pixel of a place where the brightness is maximized in the narrow range as the pixel indicating the contour. Meanwhile, when n is large, a large brightness gradient is not calculated with respect to the undulation of the brightness in the narrow range. That is, if the value of n is increased, the slight undulation of brightness in the narrow range is rarely detected as the contour, and when undulation of brightness in a wide range is generated, it is likely to determine a pixel of a place where the brightness is maximized as the pixel indicating the contour. If the value of n is excessively decreased, a noise is easily detected as the contour.

The contour extraction threshold value Pc indicates a lower limit of the brightness gradient strength for a determination as the contour. If the contour extraction threshold value Pc is excessively decreased, even when the brightness gradient strength increases due to the noise, it is likely to erroneously determine the noise as the pixel indicating the contour. Meanwhile, if the contour extraction threshold value Pc is excessively increased, the noise is not erroneously determined as the contour. However, it is likely to erroneously determine the pixel indicating the contour as the pixel not indicating the contour.

Figure 10:
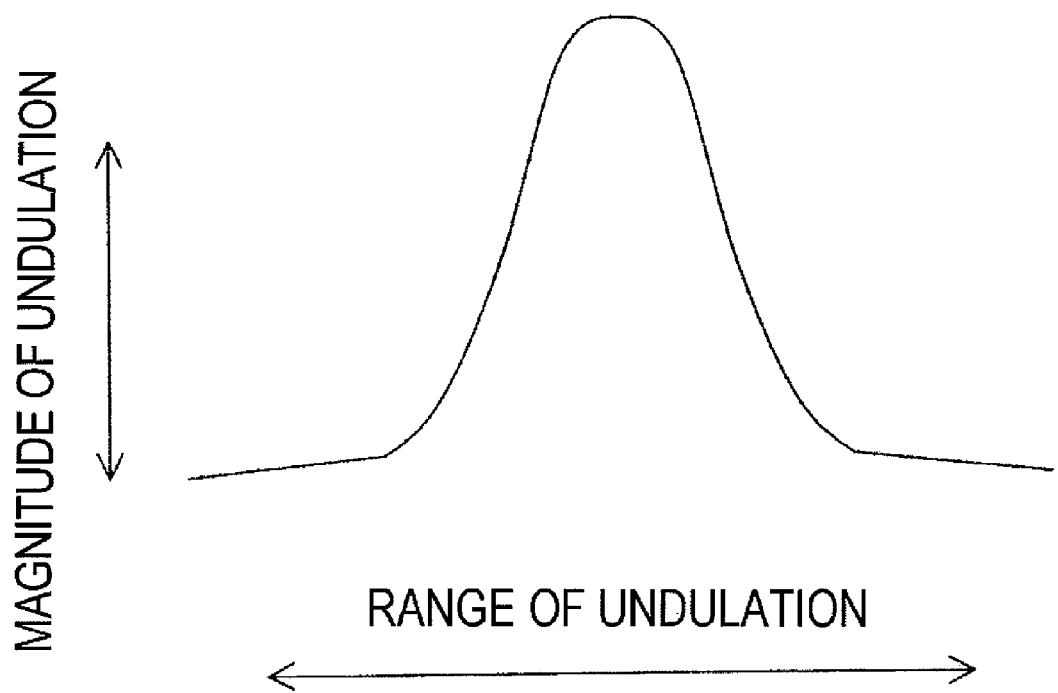
FIG. 10 is an image diagram illustrating undulation of a brightness gradient for each pixel.

FIG. 10 is an image diagram illustrating undulation of a brightness gradient for each pixel. A pixel that corresponds to a maximum point of the brightness gradient illustrated in FIG. 10 becomes the pixel indicating the contour. The "n" that is determined according to the brightness gradient calculating parameter Pb is a value that determines how wide a range in which undulation of the brightness gradient strength is enhanced. The contour extraction threshold value Pc is a value that determines a range of the magnitudes of the brightness gradient strength in which the corresponding pixel can be determined as the pixel indicating the contour.

Figure 11:
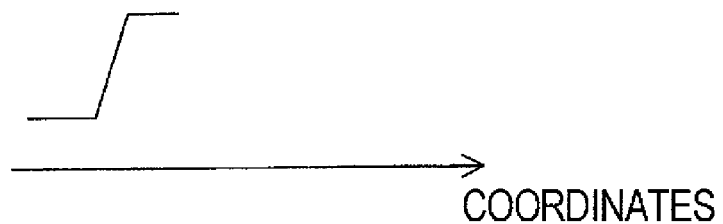
FIG. 11 is an image diagram illustrating a change in peripheral pixel values of the contour before and after an image is enlarged.
Figure 11:
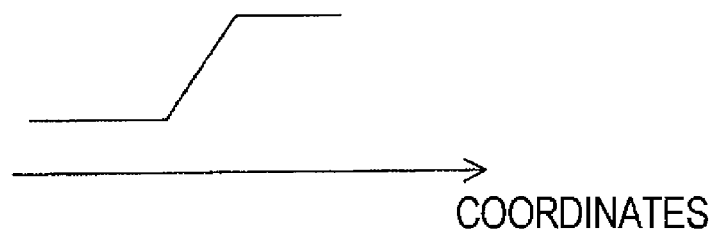
Figure 11:
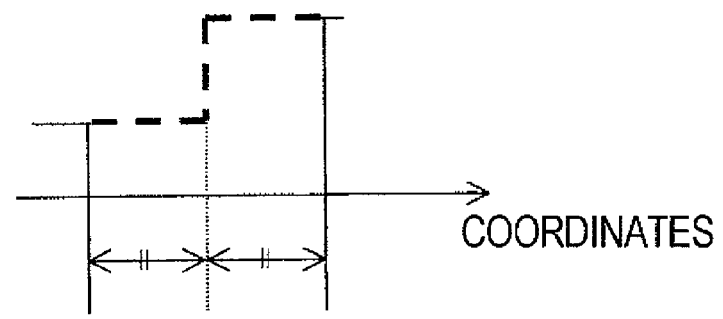

FIG. 11 is an image diagram illustrating a change in peripheral pixel values of the contour before and after an image is enlarged. FIG. 11(*a*) illustrates a change in the peripheral pixel values of the contour before the image is enlarged and FIG. 11(*b*) illustrates a change in the peripheral pixel values of the contour after the image is enlarged. As illustrated in FIG. 11(*b*), if the image is enlarged, the change in the peripheral pixel values of the contour becomes moderated. From a state illustrated in FIG. 11(*b*), the contour correcting unit 104 corrects the colors of the pixels within the predetermined distance from the reference pixel in the brightness gradient direction with the first representative color and corrects the colors of the pixels within the predetermined distance from the reference pixel in an opposite direction thereof with the second representative color (refer to FIG. 11(*c*)). As a result, as illustrated in FIG. 11(*c*), the colors of the pixels are divided into the first and second representative colors with the contour as the boundary, the brightness change becomes rapid, and the contour is sharpened. The contour correcting parameter Pd indicates the distance from the reference pixel.

As described in the first embodiment, the interpolation image Sa is input to the brightness gradient calculating unit 102 and the contour correcting unit 104. In this modification, an enlargement factor Pa from a low-resolution image (image before the enlargement) to the interpolation image Sa is input to the parameter setting unit 110. The parameter setting unit 110 calculates the brightness gradient calculating parameter Pb, the contour extraction threshold value Pc, and the contour correcting parameter Pd based on the input enlargement factor Pa.

When the enlargement factor Pa from the low-resolution image to the interpolation image Sa does not vary, the parameter setting unit 110 may store the enlargement factor Pa as a constant and calculate the brightness gradient calculating parameter Pb, the contour extraction threshold value Pc, and the contour correcting parameter Pd based on the enlargement factor Pa.

Further, Pa is a value that is represented as Wh/Wl, when the transverse width (number of pixels in a horizontal direction) of the low-resolution image (image before the enlargement) is defined as Wl and the transverse width of the interpolation image Sa is defined as Wh. A value that is obtained by dividing the longitudinal width of the interpolation image Sa by the longitudinal width of the low-resolution image may be set as the enlargement factor Pa.

Figure 12:
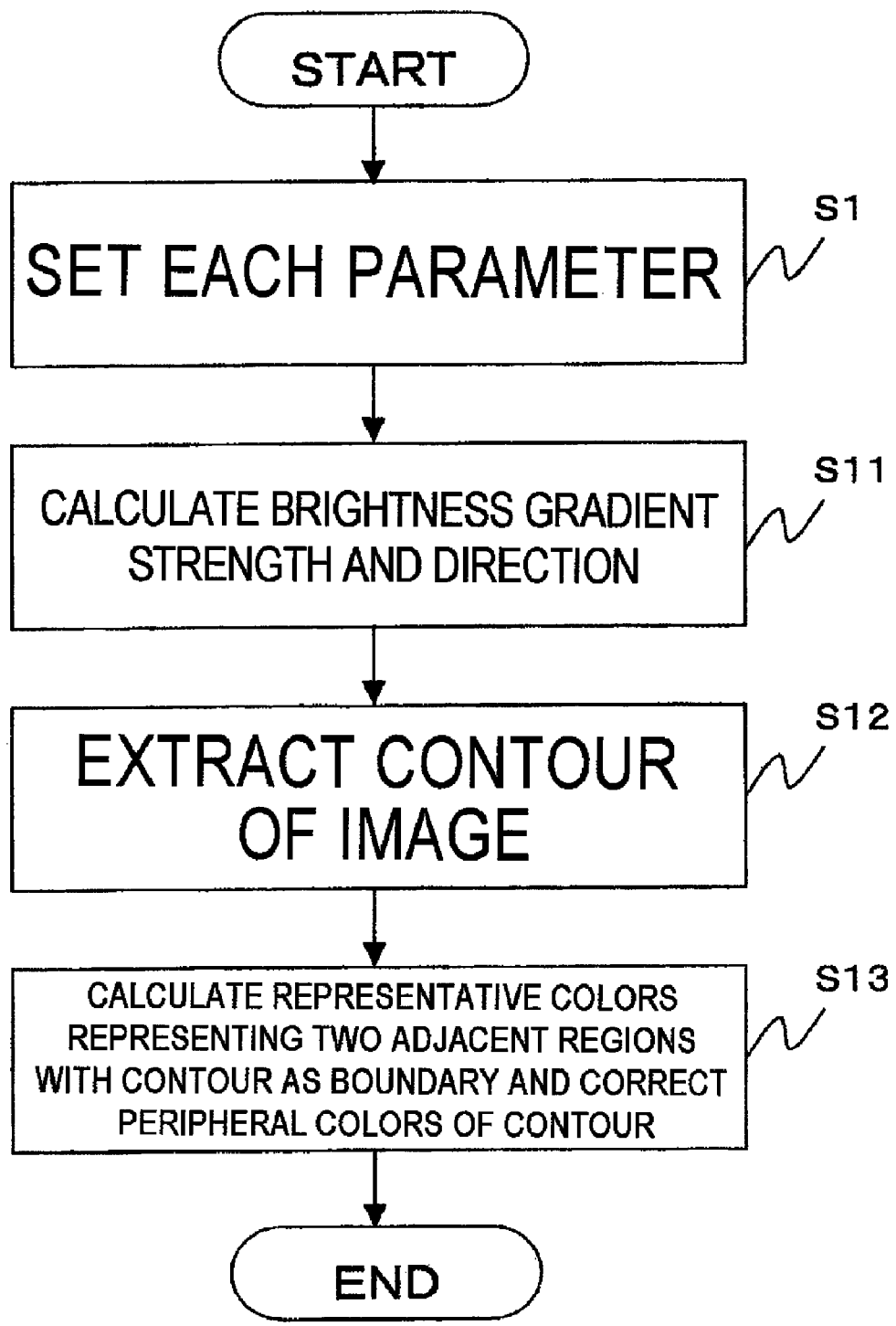
FIG. 12 is a flowchart illustrating progression of a process of the modification of the first embodiment.

FIG. 12 is a flowchart illustrating progression of a process passage of the modification of the first embodiment. In this case, the same processes as the processes described in the first embodiment are denoted by the same reference numerals as those of FIG. 3. If the enlargement factor Pa is input, the parameter setting unit 110 calculates Pb, Pc, and Pd using the enlargement factor Pa (step S1).

In step S1, the parameter setting unit 110 performs calculation of the following Equation 7 to calculate the brightness gradient calculating parameter Pb, and outputs the brightness gradient calculating parameter Pb to the brightness gradient calculating unit 102.

$$Pb = \alpha \cdot Pa + \beta \quad \text{Equation (7)}$$

Each of $\alpha$ and $\beta$ is a constant and $\alpha$ is a value that is more than 0. When Pa increases, Pb also increases. Further, $\beta$ is a value that indicates a lower limit of Pb. If $\beta$ is determined as the lower limit of Pb, even though a value of the enlargement factor Pa is small, a value of Pb is surely equal to or more than the lower limit. For example, each of $\alpha$ and $\beta$ is previously set to a manager of the image processing system. The manger of the image processing system may determine $\alpha$ and $\beta$, such that the coefficients of the Sobel filter according to the enlargement factor are selected.

In step S1, the parameter setting unit 110 performs calculation of the following Equation 8 to calculate the contour extraction threshold value Pc, and outputs the contour extraction threshold value Pc to the contour extracting unit 103.

$$Pc = \gamma \cdot Pa \quad \text{Equation (8)}$$

In this case, $\gamma$ is a constant and is previously set to the manger of the image processing system. The manager of the image processing system may determine $\gamma$, such that a relationship between the enlargement factor and the contour extraction threshold value Pc becomes a desired proportional relationship.

In step S1, the parameter setting unit 110 performs calculation of the following Equation 9 to calculate the contour correcting parameter Pd, and outputs the contour correcting parameter Pd to the contour correcting unit 104.

$$Pd = \delta \cdot Pa \quad \text{Equation (9)}$$

In this case, δ is a constant and is previously set to the manger of the image processing system. The manager of the image processing system may determine δ, such that a relationship between the enlargement factor and the contour correcting parameter Pd becomes a desired proportional relationship.

Each of Pb, Pc, and Pd is calculated as a linear function using the enlargement factor Pa as a variable.

An examples of α, β, γ, and δ, values of α=2.0, β=1.0, γ=10.0, and δ=1.5 are exemplified, but α, β, γ, and δ are not limited to the above values.

A part of Pb, Pc, and Pd may be previously determined as a fixed value, and the parameter setting unit 110 may calculate the parameter that is not determined as the fixed value among Pb, Pc, and Pd, in step S1.

After the parameter setting unit 110 calculates Pa, Pc, and Pd in step S1, the image processing system executes processes of steps S11 to S13.

The brightness gradient calculating unit 102 previously holds a rule of "the coefficients of the Sobel filter of 3 rows and 3 columns being selected when Pb is equal to or more than x1 and less than x2", and selects the coefficients of the Sobel filter according to the brightness gradient calculating parameter Pb calculated by the parameter setting unit 110, under to the rule. The brightness gradient calculating unit 102 calculates the brightness gradient strength and the brightness gradient direction for each pixel of the interpolation image Sa, using the selected coefficients of the Sobel filter, and outputs the brightness gradient strength and the brightness gradient direction of each pixel to the contour extracting unit 103 (step S11). This process is the same as the process of step S11 described above, except that the coefficients of the Sobel filter are selected.

The contour extracting unit 103 determines the pixel indicating the contour in the interpolation image Sa, using the contour extraction threshold value Pc calculated by the parameter setting unit 110 (step S12). This process is the same as the process of step S12 described above, except that the parameter setting unit 110 determines the contour extraction threshold value Pc.

The contour correcting unit 104 corrects the peripheral pixel values of the contour, using the contour correcting parameter Pd calculated by the parameter setting unit 110 as the distance to determine the first and second isolation pixels from the reference pixel (step S13). This process is the same as the process of step S13 described above, except that the parameter setting unit 110 determines the distance to determine the first and second isolation pixels based on the reference pixel.

According to the modification of the first embodiment, even when the enlargement factor from the low-resolution image to the interpolation image Sa is not constant, the contour can be sharpened using an appropriate parameter according to the enlargement factor.

Figure 13:
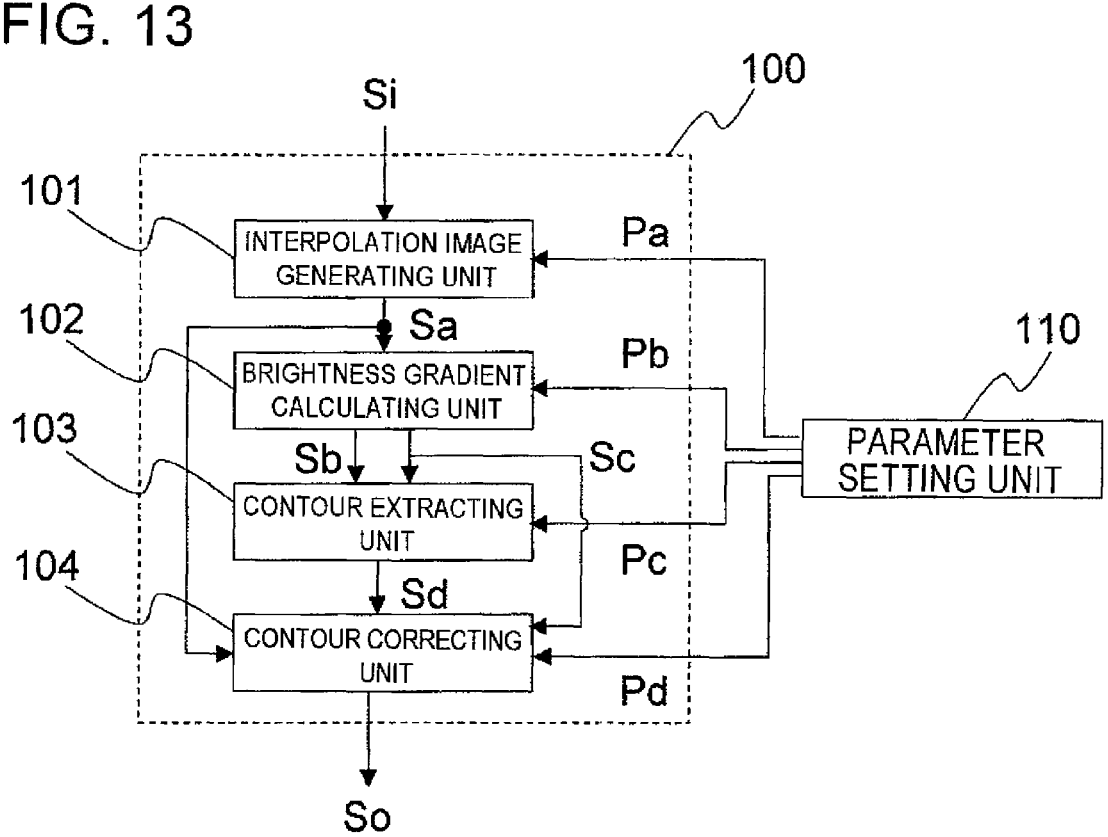
FIG. 13 is a block diagram illustrating another modification of the first embodiment.

Next, another modification of the first embodiment will be described. FIG. 13 is a block diagram illustrating another modification of the first embodiment. In this case, the same components as the components described above are denoted by the same reference numerals as those of FIGS. 1 and 9. As illustrated in FIG. 13, an image processing system may include an interpolation image generating unit 101 in addition to the brightness gradient calculating unit 102, the contour extracting unit 103, the contour correcting unit 104, and the parameter setting unit 110. In FIG. 13, the case where the computer 100 includes the interpolation image generating unit 101 is also exemplified. The interpolation image generating unit 101 may be realized by a central processing unit that operates according to a program. That is, the central processing unit may read an image processing program and operate as the interpolation image generating unit 101, the brightness gradient calculating unit 102, the contour extracting unit 103, the contour correcting unit 104, and the parameter setting unit 110, according to the image processing program.

A low-resolution image Si is input to the interpolation image generating unit 101. The interpolation image generating unit 101 enlarges the low-resolution image Si by an interpolation to generate an interpolation image Sa, and outputs the interpolation image Sa to the brightness gradient calculating unit 102 and the contour correcting unit 104. That is, the interpolation image generating unit 101 inserts pixels between the pixels of the low-resolution image Si and generates the interpolation image Sa corresponding to an enlarged image. The interpolation image generating unit 101 enlarges the low-resolution image Si by, for example, a bilinear interpolation or a bicubic interpolation.

The resolution of an enlarged image to be generated is input to the parameter setting unit 110. For example, the transverse width (number of pixels in a horizontal direction) of the interpolation image Sa after the enlargement may be input. Also, information of the low-resolution image Si (for example, transverse width of the low-resolution image Si) before the enlargement is input to the parameter setting unit 110. The parameter setting unit 110 calculates the enlargement factor Pausing the input information and outputs the enlargement factor to the interpolation image generating unit 101.

The information that is input to the parameter setting unit 110 is assumed as the transverse width (number of pixels in a horizontal direction) Wh of the interpolation image Sa after the enlargement and the transverse width Wl of the low-resolution image Si. In this case, the parameter setting unit 110 may calculate Pa=Wh/Wl and calculate the enlargement factor Pa. The information that is input to the parameter setting unit 110 may be the longitudinal width Vh (number of pixels in a vertical direction) of the interpolation image Sa and the longitudinal width Vl of the low-resolution image Si. In this case, the parameter setting unit 110 may calculate Pa=Vh/Vl and calculate the enlargement factor Pa.

After calculating the enlargement factor Pa, the parameter setting unit 110 may calculate each parameter of Pb, Pc, and Pd based on the enlargement factor Pa, as described above.

The interpolation image generating unit 101 interpolates the low-resolution image Si with the enlargement factor Pa calculated by the parameter setting unit 110 and generates the interpolation image Sa. The interpolation image generating unit 101 inserts pixels between the adjacent pixels in the low-resolution image Si, according to the enlargement factor Pa. The interpolation image Sa includes the inserted pixels and becomes an image that is enlarged from the low-resolution image Si. When the enlargement factor Pa increases, the interpolation image generating unit 101 may increase the number of inserted pixels.

Figure 14:
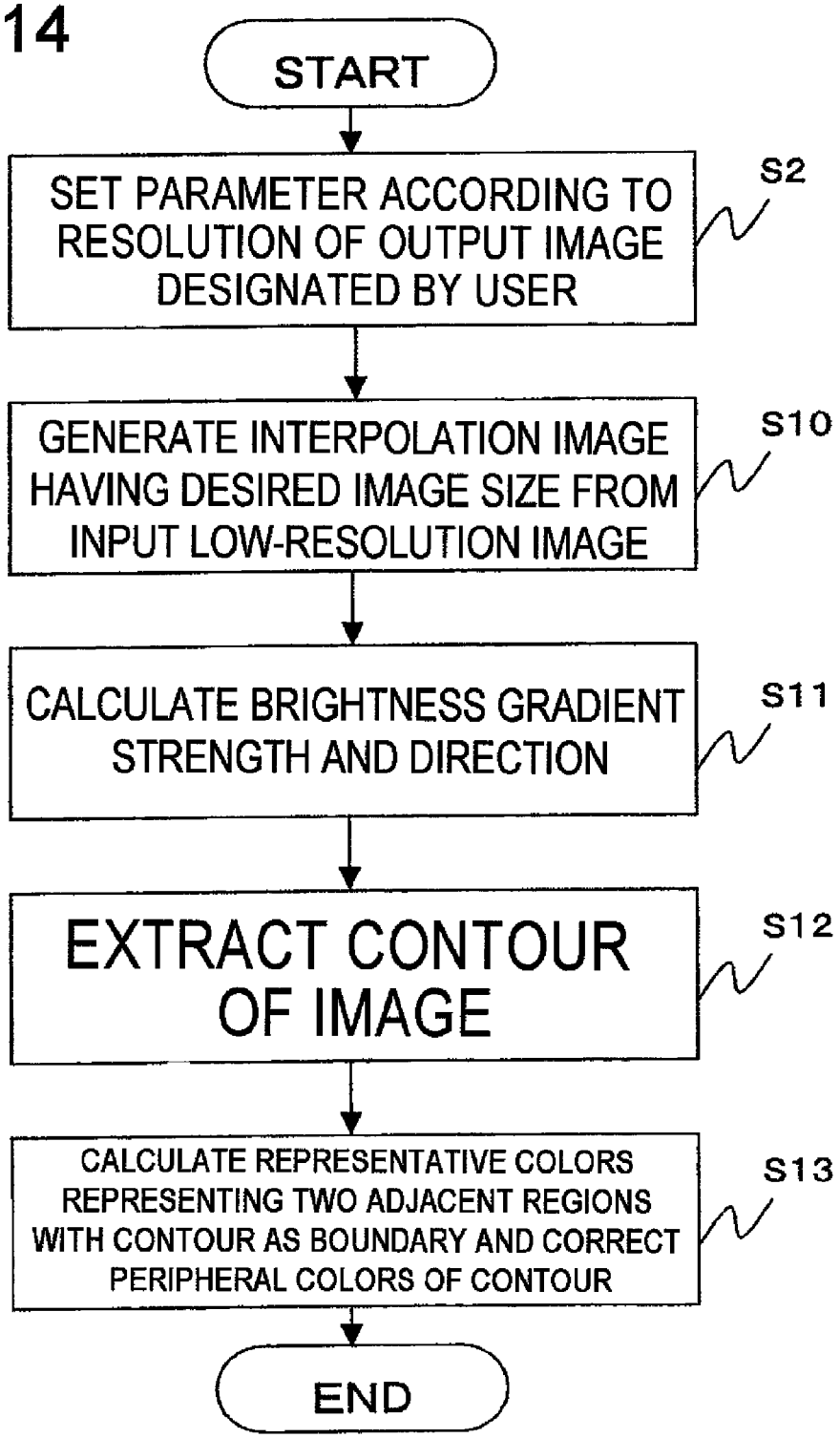
FIG. 14 is a flowchart illustrating progression of a process of another modification of the first embodiment.

FIG. 14 is a flowchart illustrating progression of a process of this modification. In this case, the same processes as those described in the first embodiment are denoted by the same reference numerals as those of FIG. 3. The transverse width Wl of the low-resolution image Si and the transverse width Wh of the desired interpolation image Sa of a user are input to the parameter setting unit 110. If Wl and Wh are input to the parameter setting unit 110, the parameter setting unit 110 calculates Wh/Wl and calculates the enlargement factor Pa. However, a calculating method of the enlargement factor Pa that is described herein is an only example and the enlargement factor Pa may be calculated by another method. The parameter setting unit 110 outputs the calculated enlargement factor Pa to the interpolation image generating unit 101. The parameter setting unit 110 calculates the brightness gradient calculating parameter Pb, the contour extraction threshold value Pc, and the contour correcting parameter Pd using the enlargement factor Pa (step S2). The parameter setting unit 110 outputs Pb to the brightness gradient calculating unit 102, outputs Pc to the contour extracting unit 103, and outputs Pd to the contour correcting unit 104. The operation for calculating Pb, Pc, and Pd based on the enlargement factor Pa is the same as that of step S1 (refer to FIG. 12) described above.

The low-resolution image Si (image before the enlargement) is input to the interpolation image generating unit 101. After step S2, the interpolation image generating unit 101 interpolates the low-resolution image Si with the enlargement factor Pa and generates the interpolation image Sa having the desired resolution of the user (step S10). The interpolation image generating unit 101 may insert the pixels of the number according to the enlargement factor Pa between the adjacent pixels in the low-resolution image Si and enlarge the image. The interpolation image generating unit 101 may perform the bilinear interpolation or the bicubic interpolation to interpolate the pixel, and enlarge the image.

Figure 15:
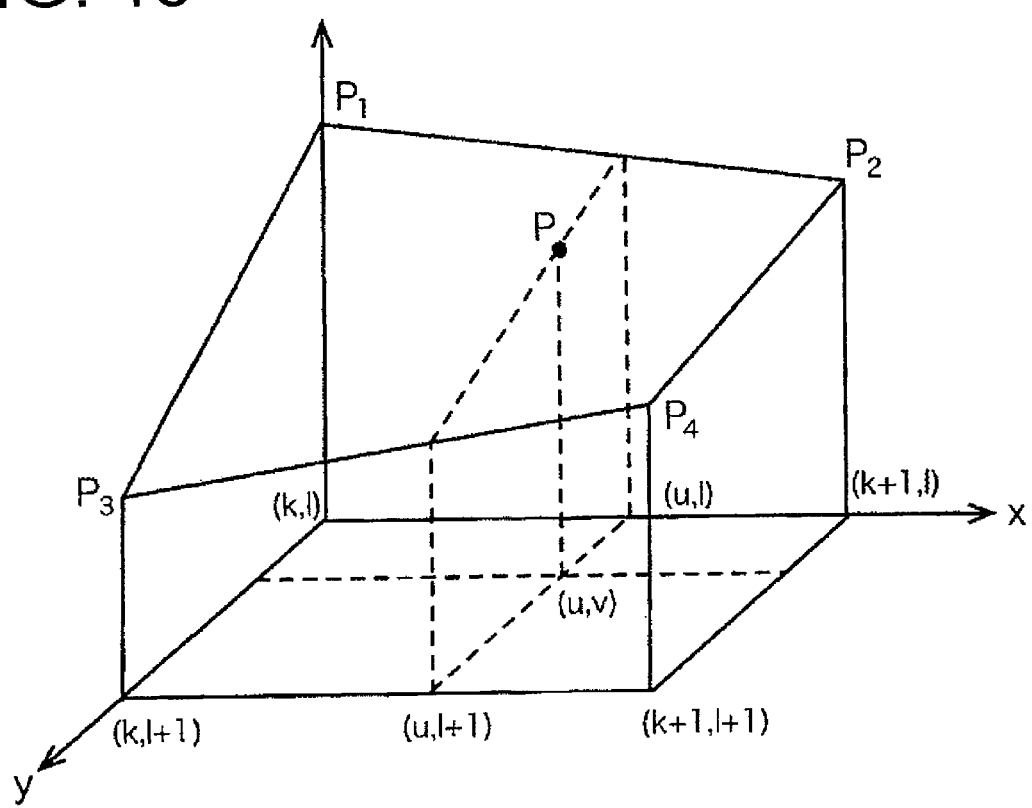
FIG. 15 is an image diagram illustrating an example of a bilinear interpolation.

The operation of when the interpolation image generating unit 101 performs the bilinear interpolation will be described. FIG. 15 is an image diagram illustrating an example of the bilinear interpolation. A longitudinal axis that is illustrated in FIG. 15 indicates a pixel value and the other two axes indicate the coordinates of an x-axis direction and a y-axis direction, respectively. The coordinates (u, v) illustrated in FIG. 15 are the coordinates of the interpolated pixel. However, the coordinates (u, v) are the coordinates in the low-resolution image Si and are represented by decimals. The x and y coordinates of the pixels that are included in the low-resolution image Si are represented by integers, such as 1, 2, 3, . . . , and the pixels are inserted between the coordinates. For this reason, the coordinates of the inserted pixels are represented by decimals. The coordinates (u, v) illustrated in FIG. 15 is a coordinate value in the low-resolution image Si. The individual coordinates (k, l), (k+1, l) (k, l+1) and (k+1, l+1) illustrated in FIG. 15 are coordinate values of the pixels that exist in the low-resolution image Si, and pixel values of these pixels are already known. These four pixels are pixels that surround the interpolated pixel (u, v), k is a value that is obtained by truncating u after the decimal point, and l is a value that is obtained by truncating v after the decimal point. The interpolation image generating unit 101 calculates a pixel value at the interpolated coordinates (u, v).

When the pixel value at the coordinates (u, v) is calculated by the bilinear interpolation, the pixel value at the coordinates (u, l) are subjected to the linear interpolation, using the pixel values at the two coordinates (k, l) and (k+1, l) where the y coordinates are equal to each other. Likewise, the pixel value at the coordinates (u, l+1) are subjected to the linear interpolation, using the pixel values at the coordinates (k, l+1) and (k+1, l+1). Further, the pixel value at the coordinates (u, v) are subjected to the linear interpolation, using the pixel values at the two coordinates (u, l) and (u, l+1) where the x coordinates are equal to each other.

A pixel value P at the coordinates (u, v) can be calculated by the following Equation 10.

$$P = \{(k+1)-u\}\{(l+1)-v\} \cdot P1 + \{(k+1)-u\}\{v-l\} \cdot P2 + \{u-k\}\{(l+1)-v\} \cdot P3 + \{u-k\}\{v-l\} \cdot P4 \quad \text{Equation (10)}$$

The interpolation image generating unit 101 may perform calculation of Equation 10 and calculate the pixel value P of the interpolated pixel. In Equation 10, P1, P2, P3, and P4 are pixel values at the coordinates (k, l), (k+1, l), (k, l+1), and (k+1, l+1), respectively. As such, the pixel at the coordinates (u, v) where the pixel value P is determined is the inserted pixel.

Figure 16:
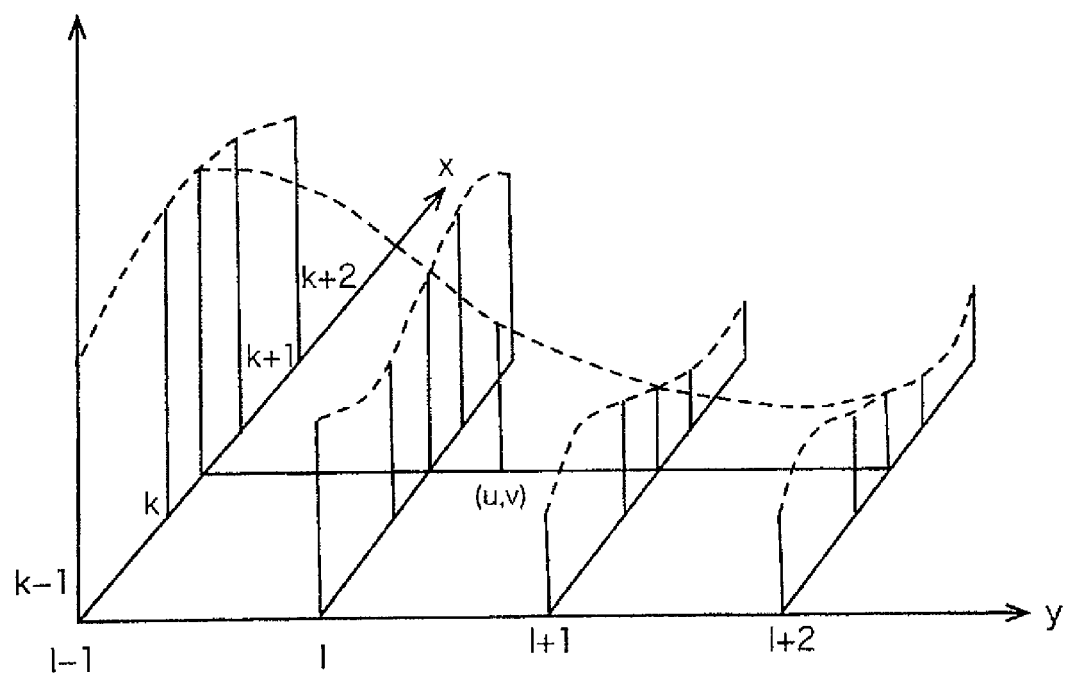
FIG. 16 is an image diagram illustrating an example of a bicubic interpolation.

The operation of when the interpolation image generating unit 101 performs the bicubic interpolation will be described. FIG. 16 is an image diagram illustrating an example of the bicubic interpolation. A longitudinal axis that is illustrated in FIG. 16 indicates a pixel value and the other two axes indicate the coordinates of an x-axis direction and a y-axis direction, respectively. The coordinates (u, v) illustrated in FIG. 16 are the coordinates of the interpolated pixel. Similar to the case illustrated in FIG. 15, the coordinates (u, v) are the coordinates in the low-resolution image Si and are represented by decimals. In the bicubic interpolation, the pixel value at the coordinates (u, v) is interpolated from the pixel values of 16 pixels (k−1, l−1), (k, l−1), (k+1, l−1), (k+2, l−1), (k−1, l), (k, l), (k+1, l), (k+2, l), (k−1, l+1), (k, l+1), (k+1, l+1), (k+2, l+1), (k−1, l+2), (k, l+2), (k+1, l+2), and (k+2, l+2) surrounding (u, v). In this case, k is a value that is obtained by truncating u after the decimal point, and l is a value that is obtained by truncating v after the decimal point.

When the pixel value at the coordinates (u, v) is calculated by the bicubic interpolation, the pixel value at the coordinates (u, l−1) is interpolated, using the pixel values at the four coordinates (k−1, l−1), (k, l−1), (k+1, l−1), and (k+2, l−1) where the y coordinates are equal to each other. Likewise, the pixel values at the coordinates (u, l), (u, l+1), and (u, l+2) are interpolated, using the pixel values at the four coordinates where the y coordinates are equal to each other. Further, the pixel value at the coordinates (u, v) is interpolated, using the pixel values at the four coordinates (u, l−1), (u, l), (u, l+1), and (u, l+2) where the x coordinates are equal to each other.

The pixel value P at the coordinates (u, v) can be calculated by the following Equation 11. As such, the pixel at the coordinates (u, v) where the pixel value P is determined is the inserted pixel.

$$P = [f_{-1}(v')\ f_0(v')\ f_1(v')\ f_2(v')] \begin{bmatrix} P1 & P2 & P3 & P4 \\ P5 & P6 & P7 & P8 \\ P9 & P10 & P11 & P12 \\ P13 & P14 & P15 & P16 \end{bmatrix} \begin{bmatrix} f_{-1}(u') \\ f_0(u') \\ f_1(u') \\ f_2(u') \end{bmatrix} \quad \text{Equation (11)}$$

The interpolation image generating unit 101 may perform calculation of Equation 11 and calculate the pixel value P of the interpolated pixel. In Equation 9, P1 to P16 are pixel values at the coordinates (k−1, l−1), (k, l−1), (k+1, l−1), (k+2, l−1), (k−1, l), (k, l), (k+1, l), (k+2, l), (k−1, l+1), (k, l+1), (k+1, l+1), (k+2, l+1), (k−1, l+2), (k, l+2), (k+1, l+2), and (k+2, l+2), respectively.

In Equation 11, f−1(t), f0(t), f1(t), and f2(t) can be represented by the following Equation.

$$f_{-1}(t) = (-t^3 + 2t^2 - t)/2 \quad \text{Equation (12)}$$

$$f_0(t) = (3t^3 - 5t^2 + 2)/2 \quad \text{Equation (13)}$$

$$f_1(t) = (-3t^3 + 4t^2 + t)/2 \quad \text{Equation (14)}$$

$$f_2(t) = (t^3 - t^2)/2 \quad \text{Equation (15)}$$

In Equation 11, u' is a value that is calculated as u'=u−k. In Equation 11, v' is a value that is calculated as v'=v−1.

When pixel values of plural kinds (for example, three kinds of R, G, and B) are set as in the pixels represented in an RGB format, the pixel value may be individually interpolated for each kind of the pixel values, such as R, G, and B.

Here, the bilinear interpolation and the bicubic interpolation are exemplified. However, the interpolation image generating unit 101 may perform interpolation with another method and enlarge the low-resolution image Si.

The interpolation image generating unit 101 outputs the interpolation image Sa, which is generated by interpolating the pixels to the low-resolution image Si, to the brightness gradient calculating unit 102 and the contour correcting unit 104. The brightness gradient calculating unit 102 selects the coefficients of the Sobel filter according to the brightness gradient calculating parameter Pb that is calculated by the parameter setting unit 110. The brightness gradient calculating unit 102 calculates the brightness gradient strength and the brightness gradient direction for each pixel of the interpolation image Sa, using the coefficients of the Sobel filter, and outputs the brightness gradient strength and the brightness gradient direction of each pixel to the contour extracting unit 103 (step S11). The contour extracting unit 103 determines the pixel indicating the contour in the interpolation image Sa, using the contour extraction threshold value Pc calculated by the parameter setting unit 110 (step S12). The contour correcting unit 104 uses the contour correcting parameter Pd calculated by the parameter setting unit 110 as the distance to determine the first and second isolation pixels from the reference pixel, and corrects the peripheral pixel values of the contour (step S13). The operation of steps S11 to S13 is the same as that of steps S11 to S13 in the modification described above.

According to this modification, since the interpolation image generating unit 101 executes an interpolation process on the low-resolution image Si to generate the interpolation image Sa. if the low-resolution image Si is input, a high-quality enlarged image can be obtained.

In the configuration including the interpolation image generating unit 101, the parameter setting unit 110 may not be provided. In this case, in the brightness gradient calculating unit 102, the brightness gradient calculating parameter Pb may be previously set. Alternatively, the coefficients of the Sobel filter may be previously set. The contour extraction threshold value Pc may be previously set in the contour extracting unit 103 and the contour correcting parameter Pd may be previously set in the contour correcting unit 104.

Second Embodiment

Figure 17:
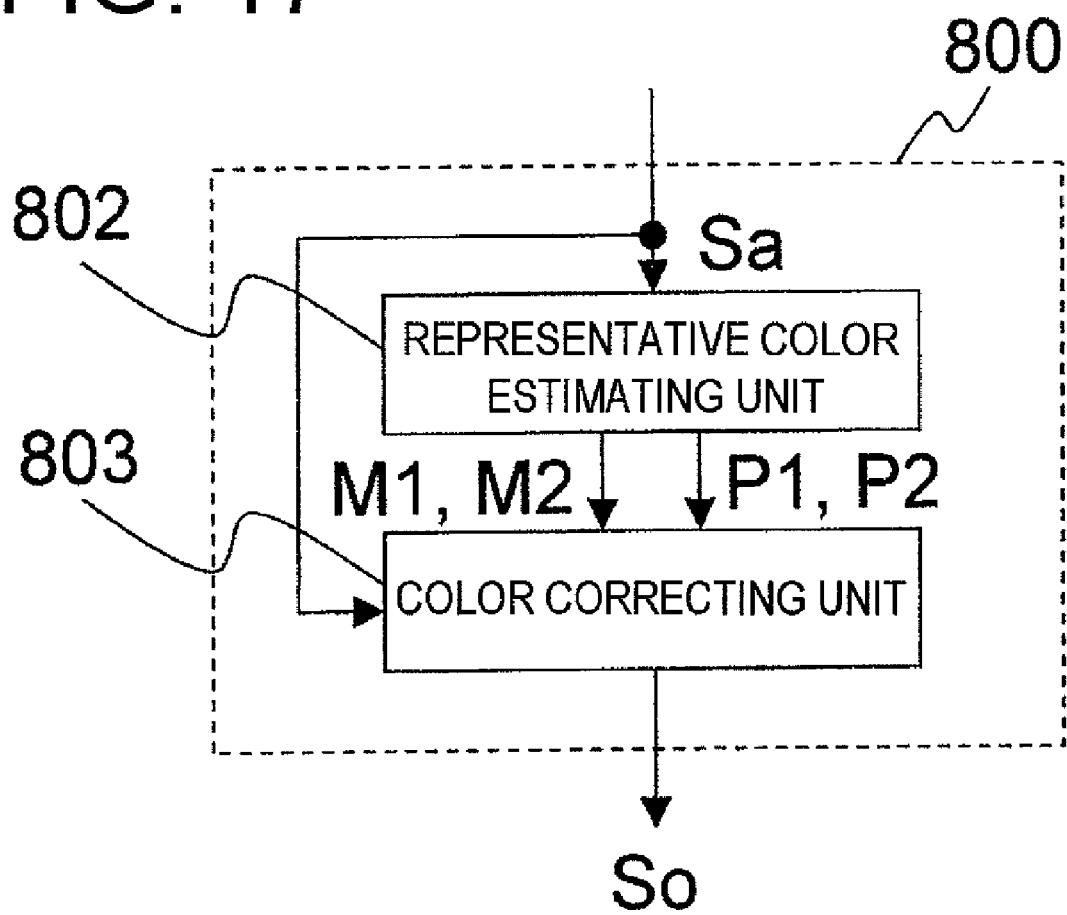
FIG. 17 is a block diagram illustrating an example of an image processing system according to a second embodiment of the present invention.

FIG. 17 is a block diagram illustrating an example of an image processing system according to a second embodiment of the present invention. Similar to the first embodiment, the image processing system according to this embodiment is realized by a computer 800 that is operated by controlling a program. The computer 800 includes a representative color estimating unit 802 and a color correcting unit 803. Here, the case where an enlargement factor from a low-resolution image (image before enlargement) to an image after the enlargement is constant is exemplified. The case where pixels are represented in an RGB format is exemplified, but the representation format of the pixels is not limited to the RGB format.

To the representative color estimating unit 802, the interpolation image Sa that is enlarged by an interpolation process (for example, bilinear interpolation or bicubic interpolation) is input. The representative color estimating unit 802 selects the individual pixels that are included in the interpolation image Sa. The representative color estimating unit 802 extracts a block (block of 5 rows and 5 columns) of pixels having a constant size based on the selected pixel, and clusters colors of the pixels in the block in two classes, respectively. The representative color estimating unit 802 specifies representative colors M1 and M2 that represent the two classes. The representative color estimating unit 802 calculates the probability of the color of each pixel in the block belonging to the first class and the probability of the color of each pixel belonging to the second class. The probability or the representative color may be calculated by, for example, an EM algorithm (Expectation Maximization algorithm). The representative color estimating unit 802 selects the individual pixels in the interpolation image Sa and performs the extraction of the block and derivation of the representative color and the probability for each pixel.

Figure 18:
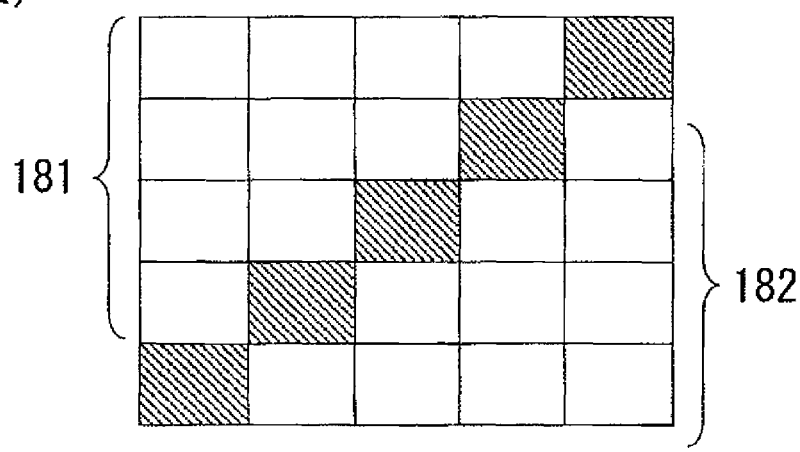
FIG. 18 is an image diagram illustrating clustering and representative colors.
Figure 18:
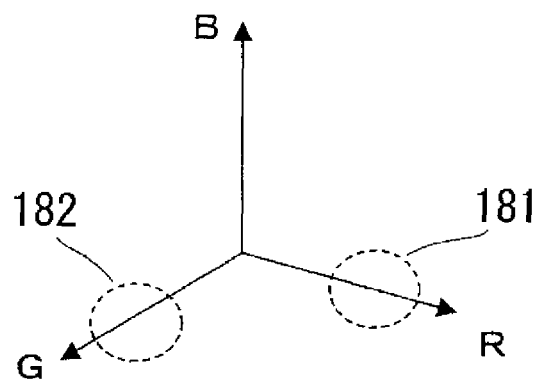

FIG. 18 is an image diagram illustrating clustering and representative colors. In this case, it is assumed that a range of 5 rows and 5 columns based on the selected pixels is extracted as a block. Pixels 181 of a red system exist in an upper left portion of the block, and pixels 182 of a green system exist in a lower right portion (refer to FIG. 18(*a*). The pixel values (R, G, and B) of the pixels 181 of the red system are represented by, for example, (255, 0, 0), (240, 0, 0), and (250, 1, 0), and exist close to each other in an RGB color space (refer to FIG. 18(*b*). Likewise, the pixel values of the pixels 182 of the green system are presented by, for example, (0, 255, 0), (0, 255, 3), and (1, 240, 5), and exist close to each other in the RGB color space (refer to FIG. 18(*b*). The representative color estimating unit 802 determines representative colors that represent the classes of the colors of the pixels and calculates the probability of the color of each pixel belonging to each class. In FIG. 18, the case where the colors of the pixels are clearly divided into the colors of the red system and the colors of the green system is exemplified. However, even though the colors of the pixels in the block are the colors of the same system, the representative colors or the probability can be calculated with the EM algorithm.

When the distances of the representative colors M1 and M2 in the color space are equal to or more than a threshold value, the color correcting unit 803 corrects the color of each pixel with any color of the representative colors M1 and M2, according to the probability of the color belonging to the first class and the probability of the color belonging to the second class, for each of the pixels in the block extracted by the representative color estimating unit 802. The color correcting unit 803 executes this process for each block extracted by the representative color estimating unit 802.

Since the block is a collection of pixels having a constant size based on each pixel of the interpolation image Sa, one pixel may belong to the plural blocks. In this case, the color correcting unit 803 sets an average of the correction results in the individual blocks to the corresponding pixel.

The representative color estimating unit 802 and the color correcting unit 803 are realized by a central processing unit (CPU) that operates according to a program. That is, the central processing unit may read an image processing program from a storage device (not illustrated) included in the computer 800, and operate as the representative color estimating unit 802 and the color correcting unit 803, according to the image processing program. The representative color estimating unit 802 and the color correcting unit 803 may be realized as individual circuits.

Next, the operation will be described in detail.

Figure 19:
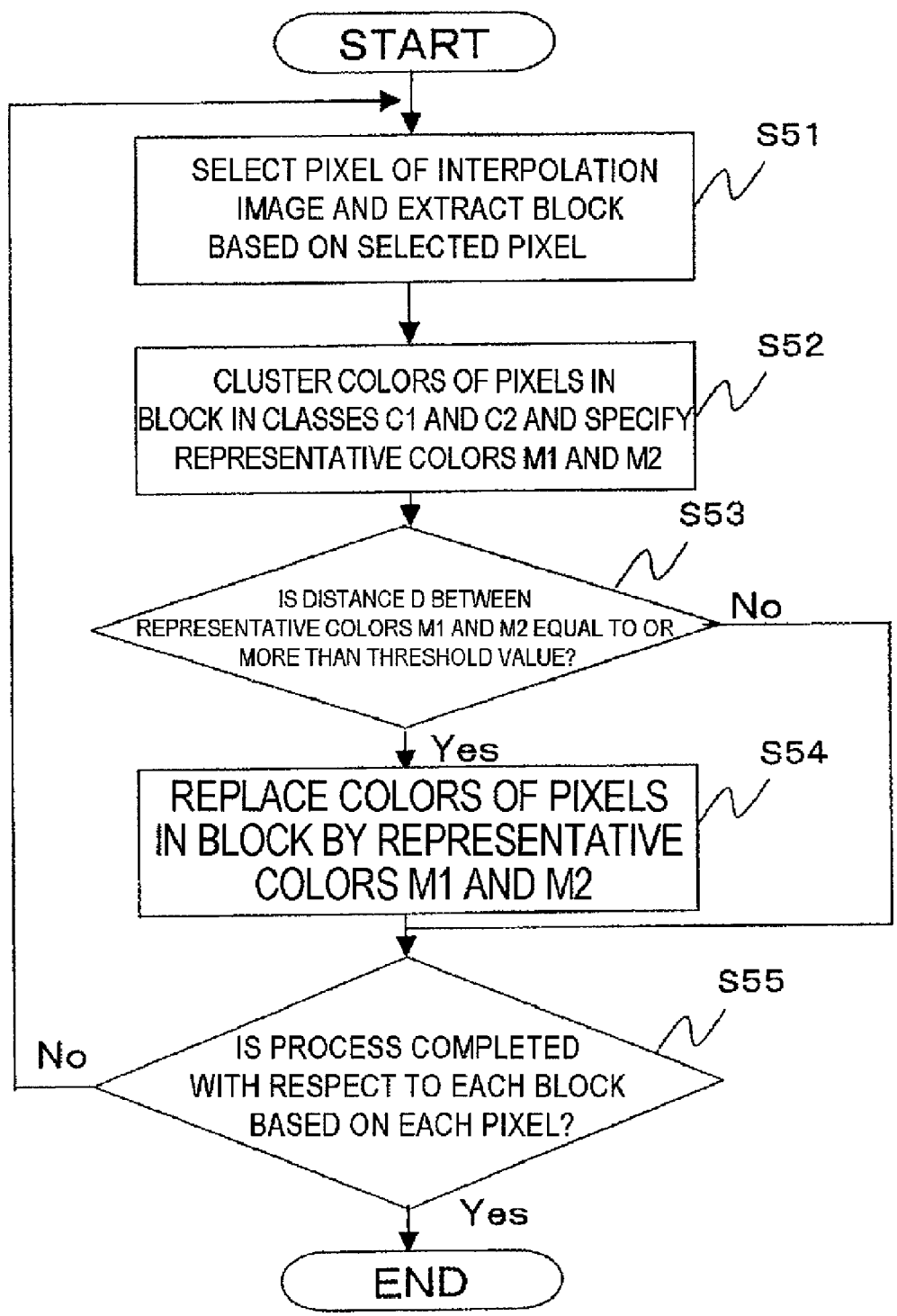
FIG. 19 is a flowchart illustrating an example of progression of a process of the second embodiment.

FIG. 19 is a flowchart illustrating an example of progression of a process of the second embodiment. In this embodiment, the interpolation image Sa is input to the representative color estimating unit 802 and the color correcting unit 803. If the interpolation image Sa is input, the representative color estimating unit 802 selects one of the pixels in the interpolation image Sa and extracts a block in a constant range based on the selected pixel (step S51). It is assumed that the block range is predetermined as, for example, 5 rows and 5 columns.

Next, the representative color estimating unit 802 clusters (sorts) the colors of the individual pixels in the extracted block in two classes C1 and C2, and specifies the representative colors M1 and M2 of the individual classes (step S52). In step S52, the representative color estimating unit 802 calculates the probability of the color of each pixel belonging to the first class C1 and the probability of the color of each pixel belonging to the second class, for each pixel in the extracted block. Hereinafter, a process of step S52 will be described by exemplifying the case of using the EM algorithm.

In the description below, n is assumed as a vector using R, G, and B values of central colors (colors being the representative colors) of the classes as elements. Further, ω is a weight coefficient that is called a mixture parameter and σ is a value that indicates an increase amount in the pixel value of the clustered pixel in the color space. Further, j is a variable to identify the two classes. For example, j=0 means the first class and j=1 means the second class. In this case, j may be used as a suffix of the symbol. The representative color estimating unit 802 generates sets of arbitrarily determined initial values of ω, μ, and σ by two sets. The two sets correspond to the first class and the second class. The representative color estimating unit 802 repetitively recalculates ω, μ, and σ for each set. By the recalculation, the representative color estimating unit 802 converges μ (values of R, G, and B in this case) and determines the representative colors. Further, θ is a symbol that indicates a set of ω, μ, and σ. When (t) is added to each symbol, t indicates a count of the recalculation. Further, a vector that uses the pixel values (R, G, and B values) of the individual pixels in the block extracted in step S51 as the elements is represented as x, and the suffix n is added to a vector x with respect to the n-th pixel in the block and the vector is represented as xn.

If the representative color estimating unit 802 generates the sets of arbitrarily determined initial values of ω, μ, and σ by the two sets, the representative color estimating unit 802 calculates the probability of each pixel in the block belonging to the class of each set, for each set. The probability is represented as P(j|xn, θ(t)). The representative color estimating unit 802 calculates P(j|xn, θ(t)) by the following Equation 16.

$$P(j \mid x_n, \theta^{(t)}) = \frac{\omega_j p(x_n \mid j)}{p(x_n)} \quad \text{Equation (16)}$$

The representative color estimating unit 802 calculates P(xn|j) of the right side by calculating the following Equation 17, when performing the calculation of Equation 16.

$$p(x_n \mid j) = \frac{1}{(2\pi)^{M/2} \sigma_j} \exp\left(-\frac{\|x_n - \mu_j\|^2}{2\sigma_j^2}\right) \quad \text{Equation (17)}$$

The representative color estimating unit 802 calculates p(xn) of the right side by calculating the following Equation 18, when performing the calculation of Equation 16.

$$p(x_n) = \sum_{j=0}^{1} \omega_j p(x_n \mid j) \quad \text{Equation (18)}$$

In this case, ωj is a weight coefficient that is called a mixture parameter and satisfies the following condition.

$$\sum_{j=0}^{1} \omega_j = 1, \ 0 \leq \omega_j \leq 1$$

If the representative color estimating unit 802 calculates P(j|xn, e(t)) by Equation 16 with respect to each j (that is, with respect to each class), the representative color estimating unit 802 recalculates ωj, μj, and σj with respect to each j.

In this case, ωj corresponds to the left side of the following Equation 19, and the representative color estimating unit 802 recalculates ωj by calculation of Equation 19.

$$\omega_j^{(t+1)} = \frac{1}{N} \sum_{n=1}^{N} P(j \mid x_n, \theta^{(t)}) \quad \text{Equation (19)}$$

In this case, μj corresponds to the left side of the following Equation 20, and the representative color estimating unit 802 recalculates μj by calculation of Equation 20.

$$\mu_j^{(t+1)} = \frac{\sum_{n=1}^{N} P(j \mid x_n, \theta^{(t)}) x_n}{\sum_{n=1}^{N} P(j \mid x_n, \theta^{(t)})} \quad \text{Equation (20)}$$

In this case, σj corresponds to the left side of the following Equation 21, and the representative color estimating unit 802 recalculates σj by calculation of Equation 21.

$$\sigma_j^{(t+1)} = \frac{1}{M} \frac{\sum_{n=1}^{N} P(j \mid x_n, \theta^{(t)}) \|x_n - \mu_j^{(t)}\|^2}{\sum_{n=1}^{N} P(j \mid x_n, \theta^{(t)})} \quad \text{Equation (21)}$$

In Equations 19 and 20, N is a total number of pixels that belong to the block extracted in step S51. Further, M is a dimension number of data (pixel value). In this example, since the pixel value is three-dimensional data of R, G, and B, M is 3.

If the representative color estimating unit 802 recalculates ωj, μj, and σj, the representative color estimating unit 802 recalculates P(j|xn, θ(t)) from ωj, μj, and σj by Equation 16 and recalculates ωj, μj, and σj by Equations 19 to 21.

When the variation in μj before and after the calculation becomes the threshold value or less, the representative color estimating unit 802 determines that μj is converged and stops the recalculation. At this time, the obtained μj becomes a value of each component of R, G, and B of the representative colors. The representative color estimating unit 802 calculates P(j|xn, θ(t)) from ωj, μj, and σj at the time of being converged. Here, P(j|xn, θ(t)) is the probability of the color of the pixel xn belonging to the class j.

By the process of step S52, the probability of the color of each pixel in the block belonging to the first class, the probability of the color of each pixel belonging to the second class, and the representative colors M1 and M2 are obtained. Hereinafter, the probability of the color of the pixel (x, y) in the block belonging to the first class is represented as P1(x, y) and the probability of the color of the pixel belonging to the second class is represented as P2(x, y).

Next, the color correcting unit 803 calculates an index according to the distance D of the representative colors M1 and M2. The distance of the two colors is a value that is obtained by calculating a square of the difference for each component indicating the color and calculating a square root of a sum of the calculation results. As in this example, when the color is represented by each component of R, G, and B, a square of the difference of the R components, a square of the difference of the G components, and a square of the difference of the B components are calculated and a square root of a sum thereof becomes the distance. That is, if the individual components of R, G, and B of the representative color M1 are represented as (R1, G1, and B1) and the individual components of R, G, and B of the representative color M2 are represented as (R2, G2, and B2), the distance D is represented by the following Equation 22.

$$D=\sqrt{\{(R1-R2)^2+(G1-G2)^2+(B1-B2)^2\}} \quad \text{Equation (22)}$$

The color correcting unit 803 may calculate the distance D or calculate the index according to the distance D. In this case, the color correcting unit 803 calculates $(R1-R2)^2+(G1-G2)^2+(B1-B2)^2$ as the index according to the distance D. The color correcting unit 803 determines whether the distance between the representative colors is equal to or more than the threshold value according to whether the index according to the distance D is equal to or more than the predetermined value (step S53).

When the calculation result of $(R1-R2)^2+(G1-G2)^2+(B1-B2)^2$ is equal to or more than the predetermined value, the color correcting unit 803 determines that the distance D is equal to or more than the threshold value. In this case (Yes of step S53), the color correcting unit 803 corrects the color of each pixel according to the probability of the color of each pixel belonging to the first class and the probability of the color of each pixel belonging to the second class, for each pixel in the block extracted in step S51 (step S54).

In step S54, the color correcting unit 803 selects each pixel in the block and compares the probability P1(x, y) of the color of each pixel belonging to the first class (class of the representative color M1) and the probability P2(x, y) of the color of each pixel belonging to the second class (class of the representative color M2). In the case of P1(x, y)>P2(x, y), the color correcting unit 803 replaces the color of the selected pixel (x, y) by the representative color M1. That is, the color correcting unit 803 replaces the pixel value (R, G, and B values) of the selected pixel by the R, G, and B values of the representative color M1. Meanwhile, if P1(x, y)>P2(x, y) is not realized, the color correcting unit 803 replaces the color of the selected pixel (x, y) by the representative color M2. That is, the color correcting unit 803 replaces the pixel value (R, G, and B values) of the selected pixel by the R, G, and B values of the representative color M2. The color correcting unit 803 performs the replacement for each pixel in the block. If the replacement with respect to each pixel in the block is completed, the color correcting unit 803 proceeds to step S55.

When the calculation result of $(R1-R2)^2+(G1-G2)^2+(B1-B2)^2$ is less than the predetermined value, the color correcting unit 803 determines that the distance D is less than the threshold value. In this case (No in step S53), the color correcting unit 803 proceeds to step S55 without executing the process of step S54.

In step S55, the color correcting unit 803 determines whether the processes after step S51 are completed with respect to each block based on each pixel in the interpolation image Sa. If there are blocks where the processes after step S51 are not executed yet, the color correcting unit 803 executes the processes after step S51 on the non-processed blocks. If the processes after step S51 are completed with respect to all of the blocks, the color correcting unit 803 ends the process.

However, when one pixel belongs to the plural blocks and the color (pixel value) of each pixel after the replacement is derived for each block, the color correcting unit 803 sets an average of the pixel values after the replacement derived with respect to one pixel for each block as a pixel value of the pixel.

According to this embodiment, when the distance of the two representative colors in the block is equal to or more than the threshold value, the color of each pixel is corrected by replacing the color of each pixel in the block by the representative color. Therefore, a high-quality enlarged image where the contour is clear can be generated. When the representative colors M1 and M2 are specified, a statistical process based on clustering is used. Therefore, representative colors can be stably obtained without an influence from the noise.

Figure 20:
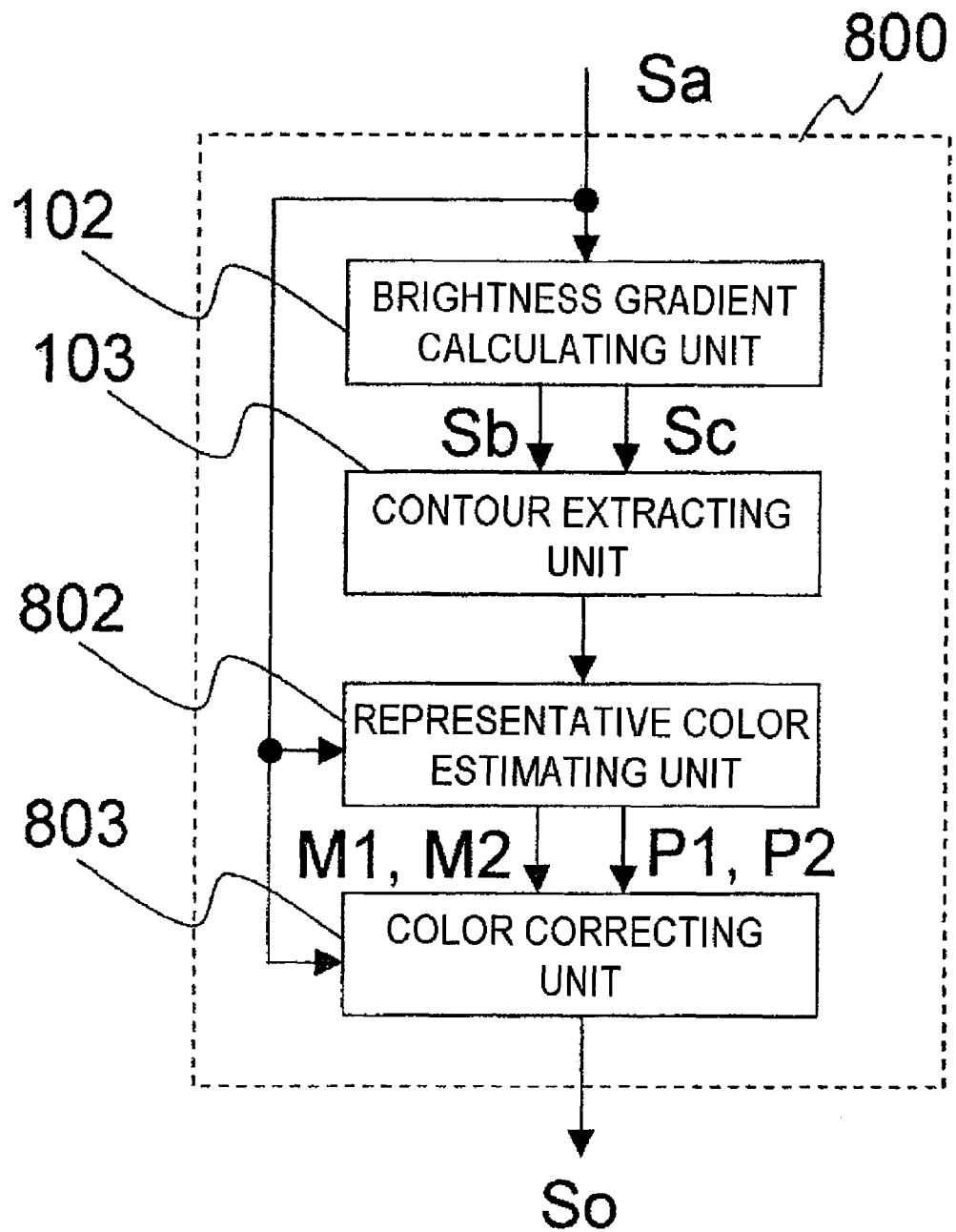
FIG. 20 is a block diagram illustrating a modification of the second embodiment.

Next, a modification of the second embodiment will be described. In the second embodiment, the case where each pixel included in the interpolation image Sa is selected, each block based on each pixel is extracted, and the processes after step S51 are executed for each block is exemplified. In the modification described below, a selection object pixel in the interpolation image Sa is set as a pixel on the contour, each block based on each pixel on the contour is extracted, and the processes after step S51 are executed. FIG. 20 is a block diagram illustrating the modification of the second embodiment. In this case, the same components as the components described above are denoted by the same reference numerals as those of FIG. 17. As illustrated in FIG. 20, an image processing system may include a brightness gradient calculating unit 102 and a contour extracting unit 103 in addition to the representative color estimating unit 802 and the color correcting unit 803. In FIG. 20, the case where the computer 800 includes the brightness gradient calculating unit 102 and the contour extracting unit 103 is exemplified. The brightness gradient calculating unit 102 and the contour extracting unit 103 may be realized by a central processing unit that operates according to a program. That is, the central processing unit may read an image processing program and operate as the brightness gradient calculating unit 102, the contour extracting unit 103, the representative color estimating unit 802, and the color correcting unit 803, according to the image processing program.

The brightness gradient calculating unit 102 and the contour extracting unit 103 in this modification execute the same processes as those of the brightness gradient calculating unit 102 and the contour extracting unit 103 included in the image processing system according to the first embodiment. The brightness gradient calculating unit 102 and the contour extracting unit 103 according to this modification are denoted by the same reference numerals as those of the first embodiment and are described.

The interpolation image Sa is input to the brightness gradient calculating unit 102 and the brightness gradient calculating unit 102 calculates the brightness gradient strength and the brightness gradient direction for each pixel of the interpolation image Sa. The contour extracting unit 103 determines the original pixel indicating the contour before being deteriorated, using the brightness gradient strength and the brightness gradient direction in each pixel.

Figure 21:
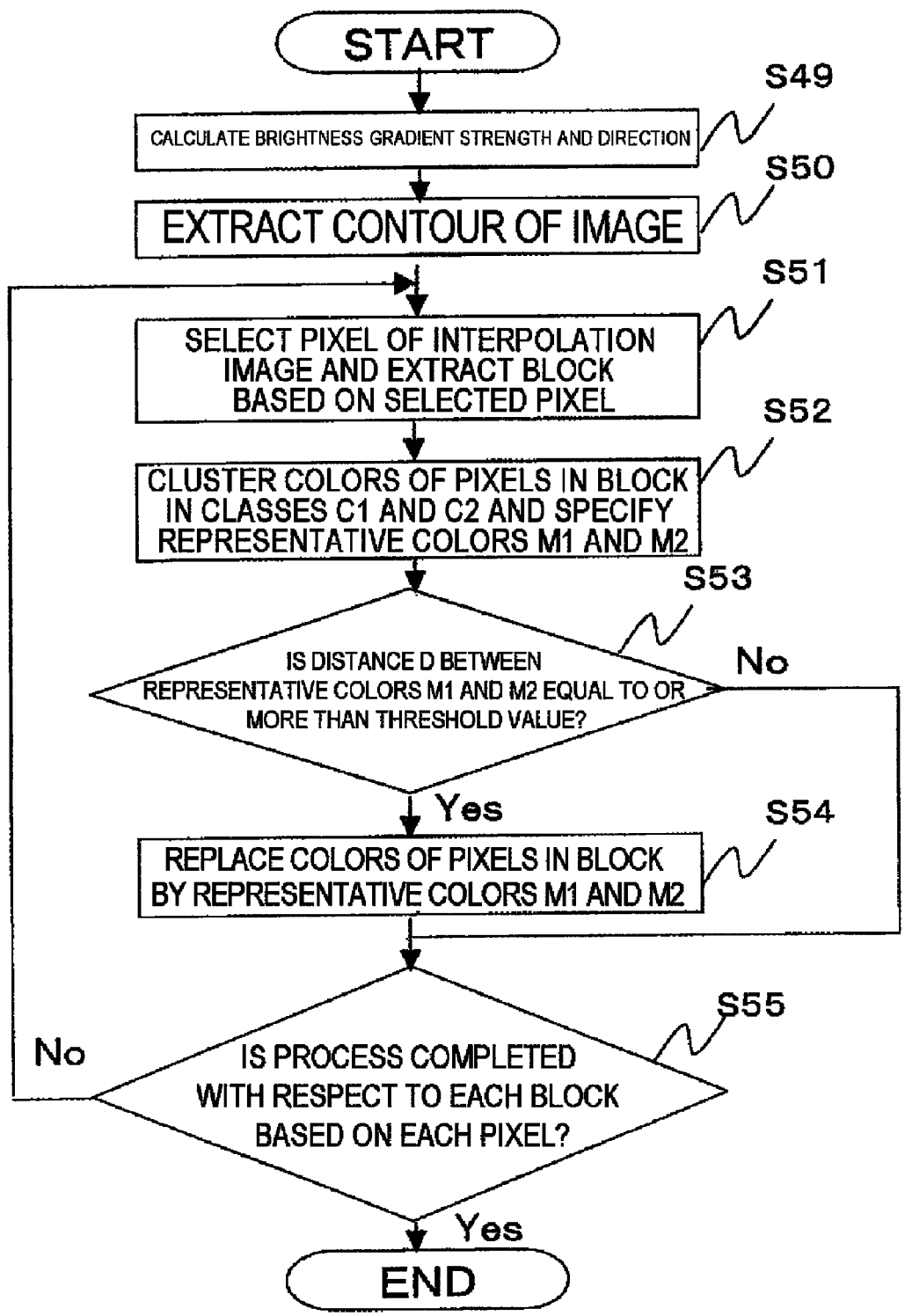
FIG. 21 is a flowchart illustrating progression of a process of the modification of the second embodiment.

FIG. 21 is a flowchart illustrating progression of a process of the modification of the second embodiment. The same processes as the processes described in the second embodiment are denoted by the same reference numerals as those of FIG. 19.

If the interpolation image Sa is input, the brightness gradient calculating unit 102 specifies the brightness value from the pixel value, for each pixel in the interpolation image Sa, similar to the first embodiment. For example, the brightness gradient calculating unit 102 calculates the brightness value for each pixel, by the calculation of Equation 1. The brightness gradient calculating unit 102 performs convolution of the predetermined coefficients of the Sobel filter and calculates the brightness gradient of a horizontal direction and the brightness gradient of a vertical direction for each pixel of the interpolation image Sa. The brightness gradient calculating unit 102 calculates the brightness gradient strength Sb(x, y) and the brightness gradient direction Sc(x, y) for each pixel (step S49). The brightness gradient strength Sb(x, y) may be calculated by Equation 4 or 5. The brightness gradient direction Sc(x, y) may be calculated by Equation 6. Here, the case where the coefficients of the Sobel filter are used is exemplified. However, a process of the case using a coefficient of another edge detection operator (coefficient of the operator of Robinson or coefficient of the operator of Prewitt) is the same as the process of the above case.

After step S49, the contour extracting unit 103 determines the pixel indicating the contour in the interpolation image Sa, using the brightness gradient strength and the brightness gradient direction of each pixel calculated by the brightness gradient calculating unit 102 and the predetermined contour extraction threshold value Pc (step S50). The contour extracting unit 103 selects each pixel as the contour determination object pixel. When the brightness gradient strength of the contour determination object pixel is more than the contour extraction threshold value Pc and is more than the brightness gradient strength of an adjacent pixel of the contour determination object pixel in the brightness gradient direction and the brightness gradient strength of an adjacent pixel in the direction of when the brightness gradient direction rotates by 180°, the contour extracting unit 103 determines that the contour determination object pixel is the pixel on the contour. The contour extracting unit 103 notifies the representative color estimating unit 802 of the pixel determined as the pixel indicating the contour.

The processes of steps S49 and S50 are the same as those of steps S11 and S12 in the first embodiment.

After step S50, the representative color estimating unit 802 and the color correcting unit 803 execute the processes of steps S51 to S55 described in the second embodiment. However, in step S51, the representative color estimating unit 802 sets only the pixel indicating the contour notified from the contour extracting unit 103 as the selection object. In step S55, the color correcting unit 803 determines whether the processes after step S51 are completed with respect to the individual pixels indicating the contour in the interpolation image Sa. If there are pixels in which the processes after step S51 are not executed among the individual pixels indicating the contour, the color correcting unit 803 repeats the processes after step S51. If the processes after step S51 are completed with respect to the individual pixels indicating the contour, the color correcting unit 803 ends the process. The other configuration is the same as the configuration of the second embodiment.

As a result, since the processes after step S51 are not executed with respect to the pixels not indicating the contour, the process can be simplified and the process time can be reduced.

Figure 22:
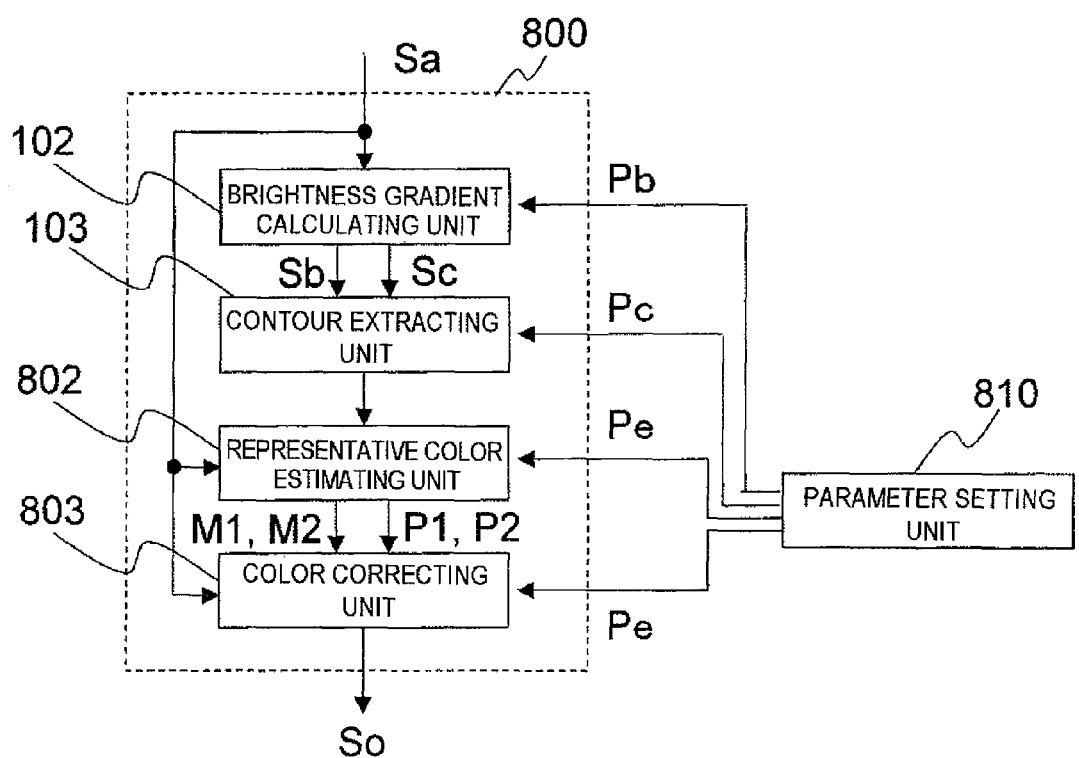
FIG. 22 is a block diagram illustrating another modification of the second embodiment.

Next, another modification of the second embodiment will be described. In the modification described below, the range of the block that is extracted in step S51 is variable. FIG. 22 is a block diagram illustrating another modification of the second embodiment. In this case, the same components as the components described above are denoted by the same reference numerals as those of FIG. 20. As illustrated in FIG. 22, an image processing system may include a parameter setting unit 810 in addition to the brightness gradient calculating unit 102, the contour extracting unit 103, the representative color estimating unit 802, and the color correcting unit 803. In FIG. 22, the case where the parameter setting unit 810 is provided separately from the computer 800 is exemplified. However, the computer 800 may include the parameter setting unit 810. The parameter setting unit 810 may be realized by a central processing unit that operates according to a program. That is, the central processing unit may read an image processing program and operate as the brightness gradient calculating unit 102, the contour extracting unit 103, the representative color estimating unit 802, the color correcting unit 803, and the parameter setting unit 810, according to the image processing program.

The parameter setting unit 810 calculates a parameter to determine numbers of rows and columns of an extracted block as the block of the pixels extracted in step S51, and outputs the parameter to the representative color estimating unit 802 and the color correcting unit 803. Hereinafter, the parameter is referred to as a block determining parameter and is represented as "Pe". In step S51, the representative color estimating unit 802 extracts a block having the magnitude according to the block determining parameter Pe.

The enlargement factor Pa from the low-resolution image to the interpolation image Sa is input to the parameter setting unit 810. The parameter setting unit 810 calculates the block determining parameter Pe from the input enlargement factor Pa. When the enlargement factor Pa does not vary, the parameter setting unit 810 may store the enlargement factor Pa as a constant and calculate the block determining parameter Pe from the enlargement factor Pa.

The parameter setting unit 810 may perform calculation of the following Equation 23 and calculate the block determining parameter Pe.

$$Pe = \epsilon \cdot Pa + \zeta \qquad \text{Equation (23)}$$

In this case, $\epsilon$ and $\zeta$ are constants and $\epsilon$ is a value that is more than 0. If a value of Pa increases, a value of Pe also increases. Further, $\zeta$ is a value that indicates a lower limit of Pe. If $\zeta$ is determined as the lower limit of Pe, even though the value of the enlargement factor Pa is small, the value of Pe is surely equal to or more than the lower limit. The values of $\epsilon$ and $\zeta$ are previously set to a manager of the image processing system. The manager of the image processing system may determine the values of $\epsilon$ and $\zeta$, such that the number of blocks having the magnitude according to the enlargement factor is selected. In this case, Pe is calculated as a linear function using the enlargement factor Pa as a variable. As examples of $\epsilon$ and $\zeta$, values of $\epsilon=2.0$ and $\zeta=-1.0$ are exemplified, but the values of $\epsilon$ and $\zeta$ are not limited to the above values.

Similar to the parameter setting unit 110 according to the modification of the first embodiment, the parameter setting unit 810 calculates the brightness gradient calculating parameter Pb and the contour extraction threshold value Pc, outputs the brightness gradient calculating parameter Pb to the brightness gradient calculating unit 102, and outputs the contour extraction threshold value Pc to the contour extracting unit 103. The brightness gradient calculating unit 102 selects the coefficients of the Sobel filter according to the brightness gradient calculating parameter Pb and calculates the brightness gradient strength and the brightness gradient direction for each pixel of the interpolation image Sa. The contour extracting unit 103 determines the pixel indicating the contour in the interpolation Sa, using the contour extraction threshold value Pc.

Figure 23:
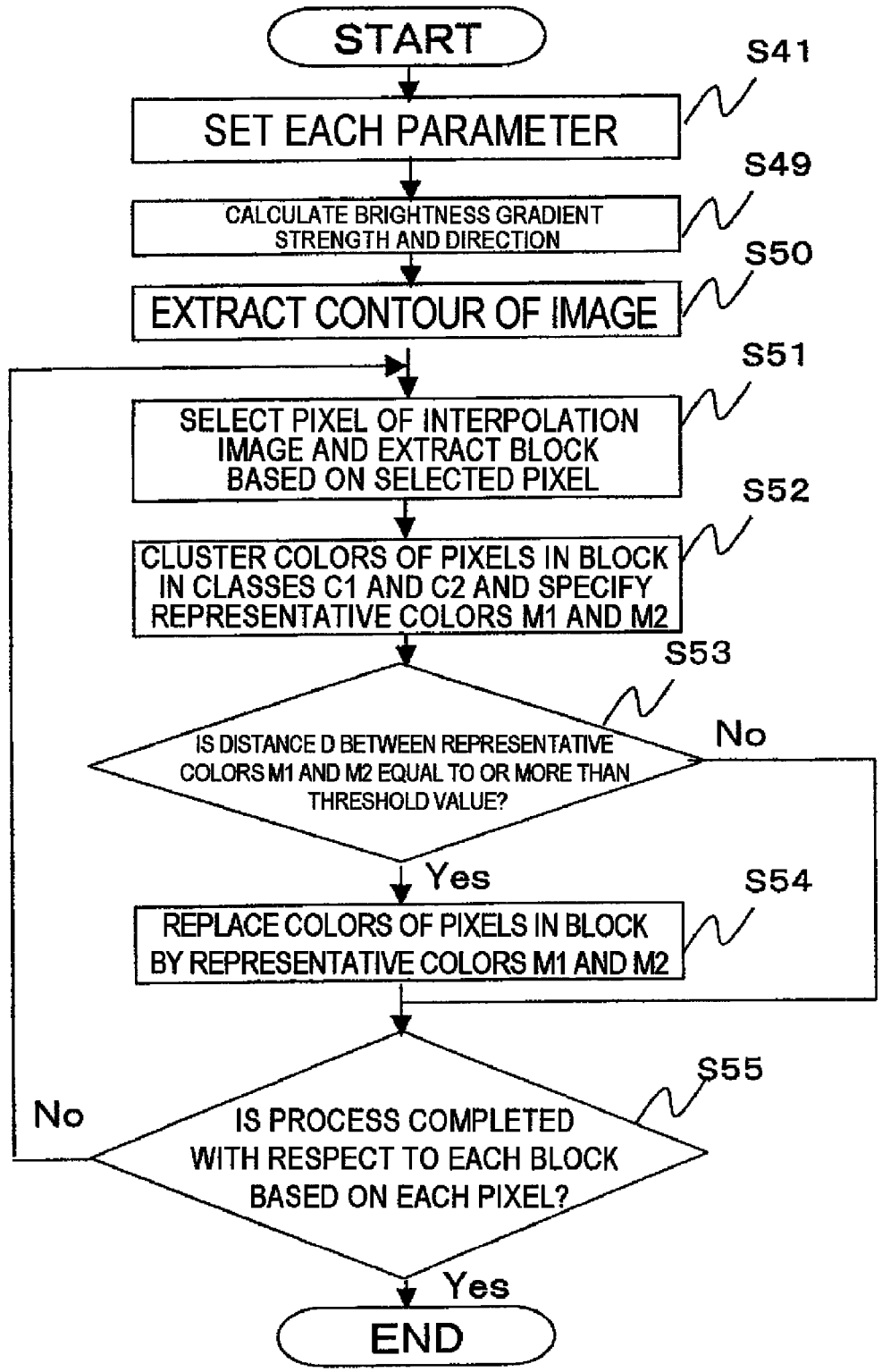
FIG. 23 is a flowchart illustrating progression of a process of another modification of the second embodiment.

FIG. 23 is a flowchart illustrating progression of a process of another modification of the second embodiment. In this case, the same processes as the processes described above are denoted by the same reference numerals as those of FIGS. 19 and 21. If the enlargement factor Pa is input, the parameter setting unit 810 calculates the brightness gradient calculating parameter Pb, the contour extraction threshold value Pc, and the block determining parameter Pe, using the enlargement factor Pa (step S41). The parameter setting unit 810 may previously determine a part of Pb, Pc, and Pe as fixed values, and may calculate the parameter not determined as the fixed value among Pb, Pc, and Pe, in step S41.

If the interpolation image Sa is input, the brightness gradient calculating unit 102 specifies the brightness value based on the pixel value, for each pixel in the interpolation image Sa. The brightness gradient calculating unit 102 previously holds a rule of "the coefficients of the Sobel filter of 3 rows and 3 columns being selected when Pb is equal to or more than x1 and less than x2", and selects the coefficients of the Sobel filter according to the brightness gradient calculating parameter Pb, under the rule. The brightness gradient calculating unit 102 calculates the brightness gradient strength and the brightness gradient direction for each pixel of the interpolation image Sa, using the selected coefficients of the Sobel filter (step S49). Except that the coefficients of the Sobel filter are selected, this step is the same as step S49 described above.

The contour extracting unit 103 determines the pixel indicating the contour in the interpolation image Sa, using the contour extraction threshold value Pc calculated by the parameter setting unit 810 (step S50). Except that the parameter setting unit 810 determines the contour extraction threshold value Pc, this step is the same as step S50 described above.

After step S50, the representative color estimating unit 802 and the color correcting unit 803 execute the processes of steps S51 to S55, similar to the modification of the second embodiment described above. In step S51, the representative color estimating unit 802 sets only the pixel indicating the contour notified from the contour extracting unit 103 as the selection object. In step S55, the color correcting unit 803 determines whether the processes after step S51 are completed with respect to the individual pixels indicating the contour in the interpolation image Sa. If there are pixels in which the processes after step S51 are not executed among the individual pixels indicating the contour, the color correcting unit 803 repeats the processes after step S51. If the processes after step S51 are completed with respect to the individual pixels indicating the contour, the color correcting unit 803 ends the process.

In this modification, since the processes after step S51 are not executed with respect to the pixels not indicating the contour, the process can be simplified and the process time can be reduced. Even when the enlargement factor from the low-resolution image to the interpolation image Sa is not constant, the contour can be sharpened using an appropriate parameter according to the enlargement factor.

Figure 24:
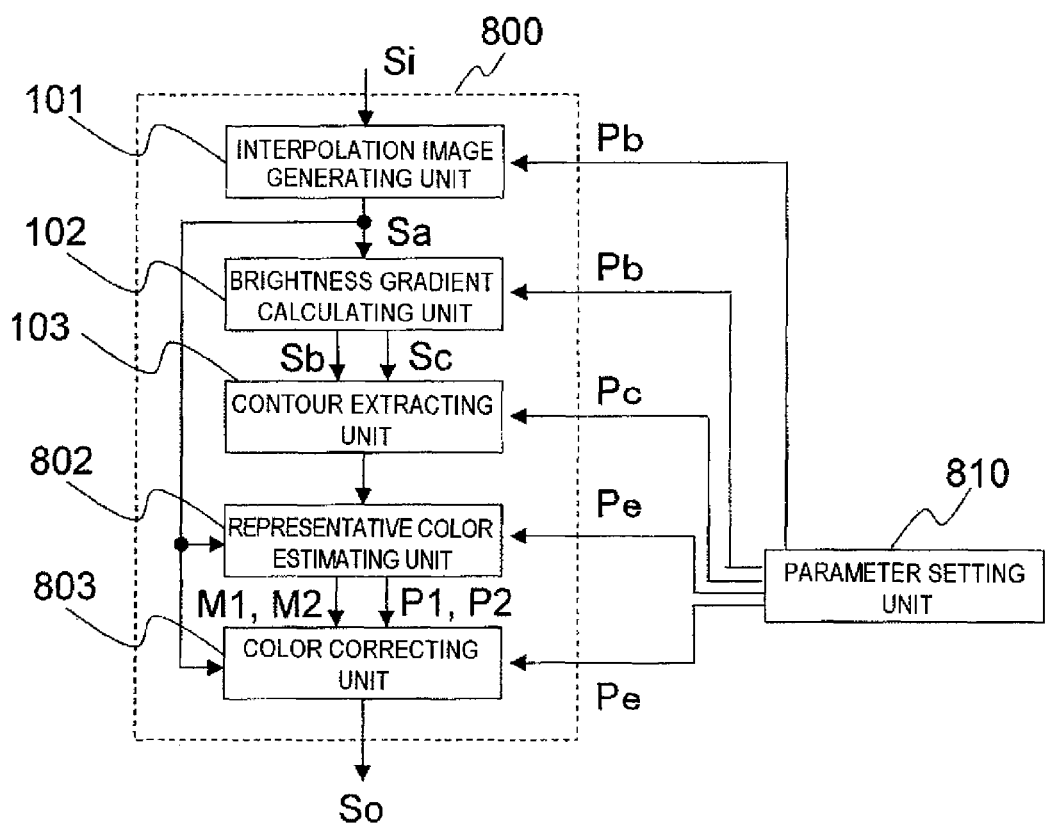
FIG. 24 is a block diagram illustrating still another modification of the second embodiment.

Next, still another modification of the second embodiment will be described. FIG. 24 is a block diagram illustrating still another modification of the second embodiment. In this case, the same components as the components described above are denoted by the same reference numerals as those of FIGS. 17, 20, and 22. As illustrated in FIG. 24, an image processing system may include an interpolation image generating unit 101 in addition to the brightness gradient calculating unit 102, the contour extracting unit 103, the representative color estimating unit 802, the color correcting unit 803, and the parameter setting unit 810. The interpolation image generating unit 101 executes the same process as that of the interpolation image generating unit 101 (refer to FIG. 13) according to the modification of the first embodiment. In FIG. 24, the case where the computer 800 includes the interpolation image generating unit 101 is exemplified. The interpolation image generating unit 101 may be realized by a central processing unit that operates according to a program. That is, the central processing unit may read an image processing program and operate as the interpolation image generating unit 101, the brightness gradient calculating unit 102, the contour extracting unit 103, the representative color estimating unit 802, the color correcting unit 803, and the parameter setting unit 810, according to the image processing program.

The low-resolution image Si is input to the interpolation image generating unit 101, and the interpolation image generating unit 101 enlarges the low-resolution image Si by an interpolation to generate an interpolation image Sa, and outputs the interpolation image Sa to the brightness gradient calculating unit 102, the representative color estimating unit 802, and the color correcting unit 803. That is, the interpolation image generating unit 101 inserts pixels between the pixels of the low-resolution image Si and generates the interpolation image Sa corresponding to the enlarged image. The interpolation image generating unit 101 enlarges the low-resolution image Si by, for example, a bilinear interpolation or a bicubic interpolation.

The resolution of an enlarged image to be generated is input to the parameter setting unit 810. For example, the transverse width (number of pixels in a horizontal direction) of the interpolation image Sa after the enlargement may be input. Further, information of the low-resolution image Si (for example, transverse width of the low-resolution image Si) before the enlargement is also input to the parameter setting unit 810. The parameter setting unit 810 calculates the enlargement factor Pa using the input information and outputs the enlargement factor to the interpolation image generating unit 101. After calculating the enlargement factor Pa, the parameter setting unit 810 may calculate each parameter of Pb, Pc, and Pd from the enlargement factor Pa, as described above. This operation is the same as the operation of the parameter setting unit 110 (refer to FIG. 13) according to the modification of the first embodiment.

The interpolation image generating unit 101 interpolates the low-resolution image Si with the enlargement factor Pa calculated by the parameter setting unit 810 and generates the interpolation image Sa.

Figure 25:
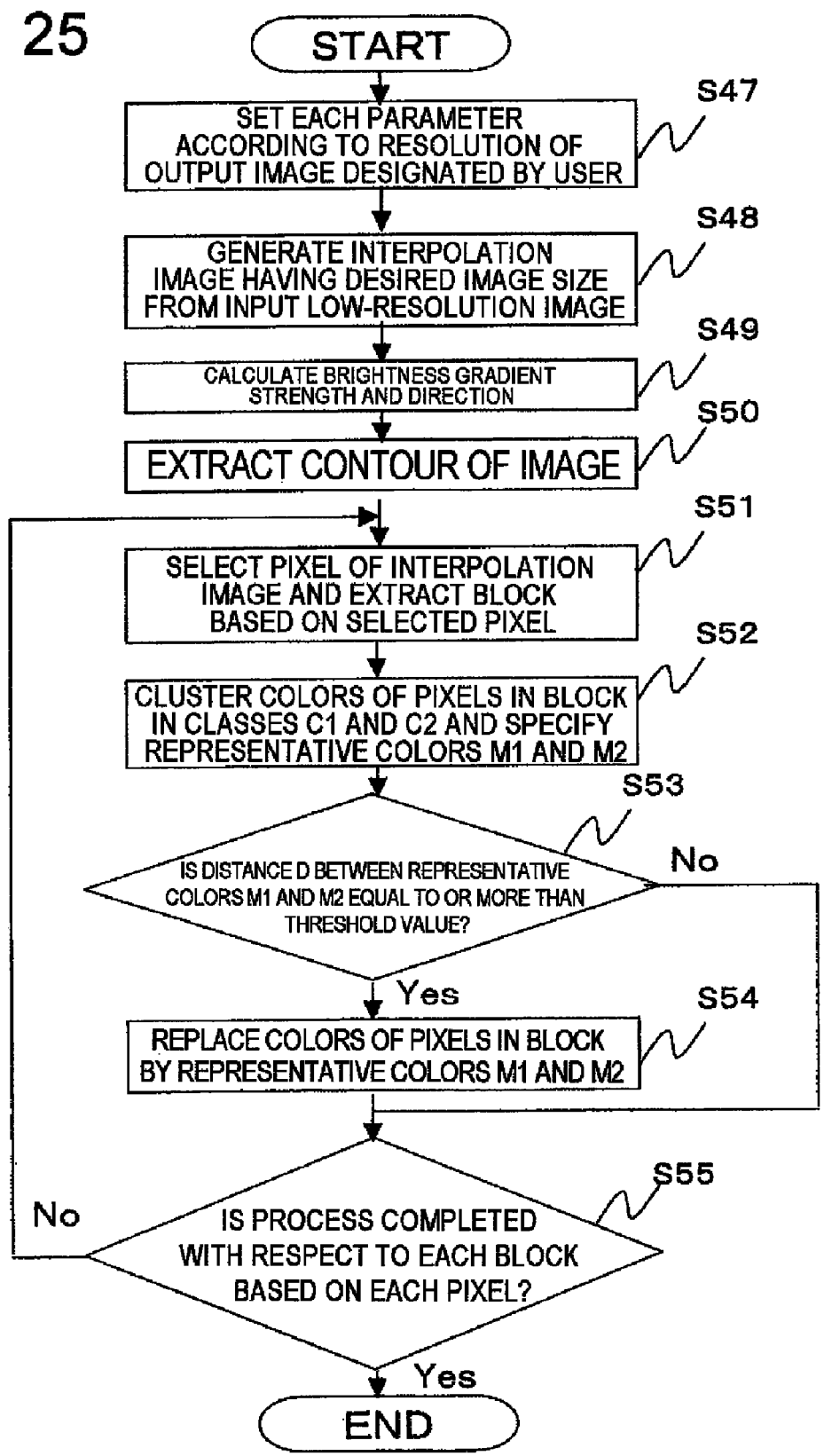
FIG. 25 is a flowchart illustrating progression of a process of still another modification of the second embodiment.

FIG. 25 is a flowchart illustrating progression of a process of this modification. In this case, the same processes as the processes described above are denoted by the same reference numerals as those of FIGS. 19 and 21. The transverse width Wl of the low-resolution image Si and the transverse width Wh of the desired interpolation image Sa of a user are input to the parameter setting unit 810. If the transverse widths Wl and Wh are input to the parameter setting unit 810, the parameter setting unit 810 calculates Wh/Wl and calculates the enlargement factor Pa. However, a calculating method of the enlargement factor Pa described herein is an only example and the enlargement factor Pa may be calculated by another method. The parameter setting unit 810 outputs the calculated enlargement factor Pa to the interpolation image generating unit 101. The parameter setting unit 810 calculates the brightness gradient calculating parameter Pb, the contour extraction threshold value Pc, and the block determining parameter Pe using the enlargement factor Pa (step S47). The parameter setting unit 810 outputs the brightness gradient calculating parameter Pb to the brightness gradient calculating unit 102, outputs the contour extraction threshold value Pc to the contour extracting unit 103, and outputs the block determining parameter Pe to the representative color estimating unit 802 and the color correcting unit 803. The operation for calculating Pb, Pc, and Pd from the enlargement factor Pa is the same as the operation described above.

The low-resolution image Si is input to the interpolation image generating unit 101. After step S47, the interpolation image generating unit 101 interpolates the low-resolution image Si with the enlargement factor Pa and generates the interpolation image Sa having the desired resolution of the user (step S48). This process is the same as that of step S10 (refer to FIG. 14) described in the modification of the first embodiment.

The interpolation image generating unit 101 outputs the interpolation image Sa, which is generated by interpolating the pixels with respect to the low-resolution image Si, to the brightness gradient calculating unit 102, the representative color estimating unit 802, and the color correcting unit 803. The brightness gradient calculating unit 102 selects the coefficients of the Sobel filter according to the brightness gradient calculating parameter Pb that is calculated by the parameter setting unit 810. The brightness gradient calculating unit 102 calculates the brightness gradient strength and the brightness gradient direction for each pixel of the interpolation image Sa, using the coefficients of the Sobel filter, and outputs the brightness gradient strength and the brightness gradient direction of each pixel to the contour extracting unit 103 (step S49). The contour extracting unit 103 determines the pixel indicating the contour in the interpolation image Sa, using the contour extraction threshold value Pc calculated by the parameter setting unit 810 (step S50).

After step S50, the representative color estimating unit 802 and the color correcting unit 803 execute the processes of steps S51 to S55, similar to the modification of the second embodiment described above. In step S51, the representative color estimating unit 802 sets only the pixel indicating the contour notified from the contour extracting unit 103 as the selection object. In step S55, the color correcting unit 803 determines whether the processes after step S51 are completed with respect to the individual pixels indicating the contour in the interpolation image Sa. If there are pixels in which the processes after step S51 are not executed among the individual pixels indicating the contour, the color correcting unit 803 repeats the processes after step S51. If the processes after step S51 are completed with respect to the individual pixels indicating the contour, the color correcting unit 803 ends the process.

According to this modification, the interpolation image generating unit 101 executes an interpolation process on the low-resolution image Si to generate the interpolation image Sa. If the low-resolution image Si is input, a high-quality enlarged image can be obtained.

In the configuration (for example, configuration illustrated in FIGS. 22 and 24) including the parameter setting unit 810, the image processing system may include the brightness gradient calculating unit 102 and the contour extracting unit 103. In this case, the parameter setting unit 810 may not calculate Pb and Pc.

Third Embodiment

Figure 26:
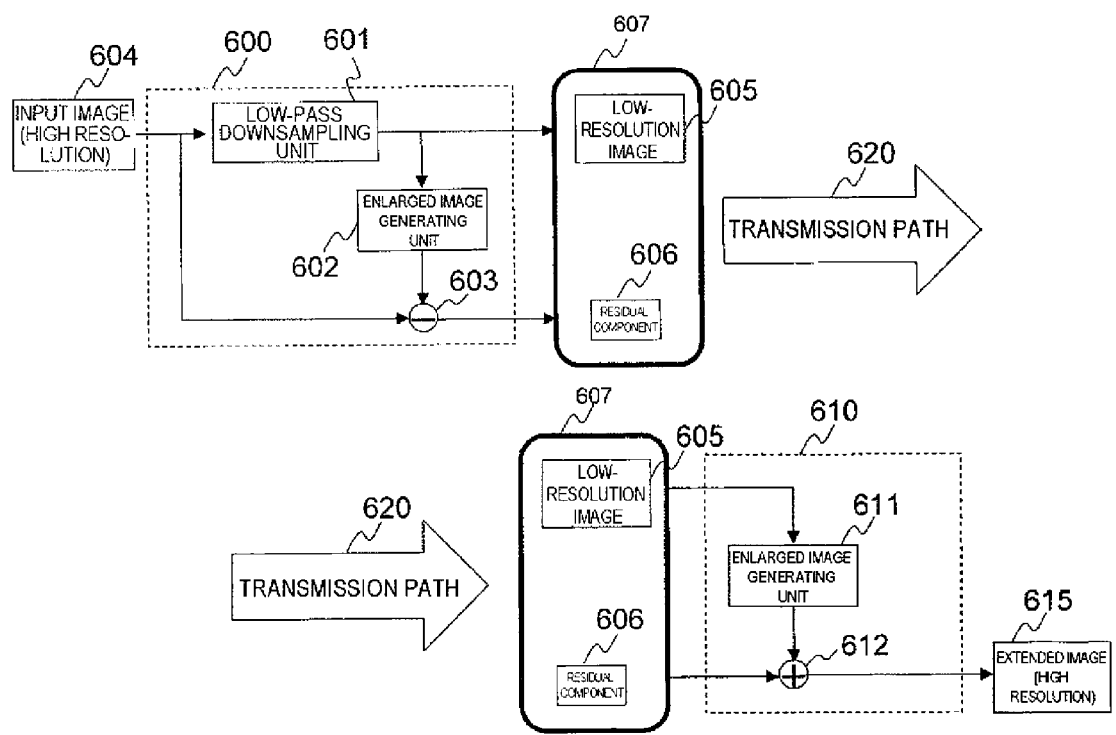
FIG. 26 is a block diagram illustrating a third embodiment of the present invention.
Figure 27:
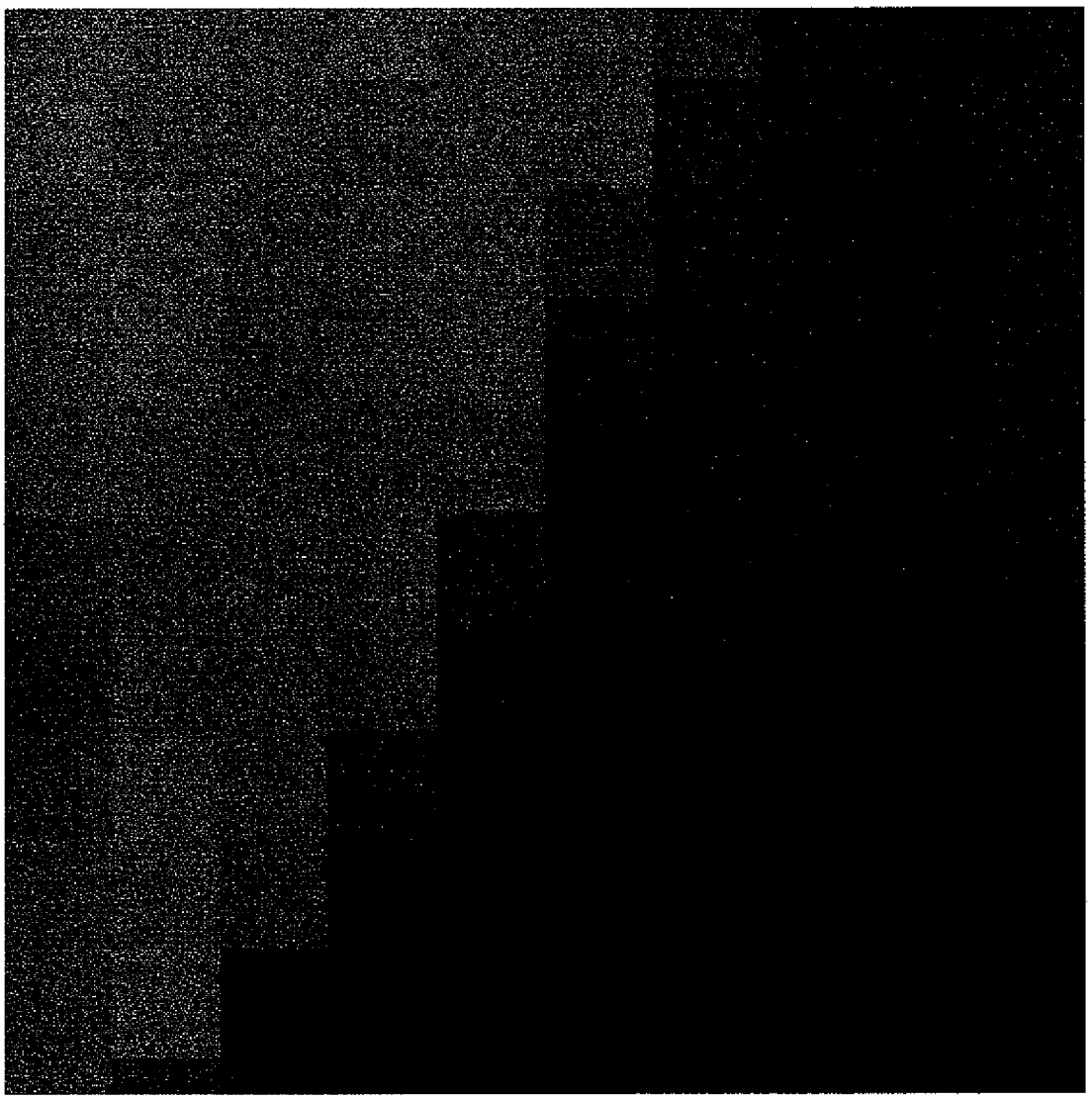
FIG. 27 is an image illustrating an example of an upsampling result of a low-resolution image.

FIG. 26 is a block diagram illustrating a third embodiment of the present invention. The third embodiment of the present invention relates to an image transmitting system that includes an image compressing apparatus 600 compressing an image and transmitting the image and an image extending apparatus 610 receiving the image and extending the image. The image compressing apparatus 600 and the image extending apparatus 610 transmits and receives the image through a transmission path 620.

A high-resolution input image 604 is input to the image compressing apparatus 600. The image compressing apparatus 600 transmits a low-resolution image 605 obtained by downsampling the input image 604 and a residual component 606 of the downsampled image and the input image as compression data 607 to the transmission path 620. The image extending apparatus 610 enlarges the low-resolution image 605 that is included in the received compression data 607, adds the residual component 606 included in the compression data 607, and generates an extended image 615. Hereinafter, the configuration of the image compressing apparatus 600 and the image extending apparatus 610 will be described.

The image compressing apparatus 600 includes a low-pass downsampling unit 601, an enlarged image generating unit 602, and an image subtracting unit 603.

An input image (high-resolution image) 604 is input to the low-pass downsampling unit 601. The input image 604 is also input to the image subtracting unit 603. The low-pass downsampling unit 601 applies a low-pass filter to the input image 604 and downsamples the input image 604 with predetermined resolution. The downsampling means that pixels arranged in horizontal and vertical directions are periodically removed and the resolution of an image is decreased. The low-pass downsampling unit 601 transmits the generated low-resolution image 605 to the transmission path 620 and outputs the generated low-resolution image to the enlarged image generating unit 602.

The enlarged image generating unit 602 receives the low-resolution image 605 that is generated by the low-pass downsampling unit 601 and enlarges the low-resolution image 605 to an image having the same resolution as the input image 604. The enlarged image generating unit 602 executes an image process for sharpening the contour of the enlarged image and outputs the obtained image to the image subtracting unit 603. This process is the same as the process executed by the image processing system including the interpolation image generating unit 101 according to the modification of the first embodiment and the image processing system including the interpolation image generating unit 101 according to the modification of the second embodiment.

The enlarged image generating unit 602 is realized by the image processing system (refer to FIG. 13) including the interpolation image generating unit 101 according to the modification of the first embodiment. The parameter setting unit 110 may set the enlargement factor Pa, the brightness gradient calculating parameter Pb, the contour extraction threshold value Pc, and the contour correcting parameter Pd. The information (Wh and Wl) that is needed to calculate the enlargement factor Pa by the parameter setting unit 110 may be predetermined.

The enlarged image generating unit 602 may be realized by the image processing system (refer to FIG. 24) including the interpolation image generating unit 101 according to the modification of the second embodiment. The parameter setting unit 110 may set the enlargement factor Pa, the brightness gradient calculating parameter Pb, the contour extraction threshold value Pc, and the block determining parameter Pe. The information (Wh and Wl) that is needed to calculate the enlargement factor Pa by the parameter setting unit 810 may be predetermined.

The parameter setting units 110 and 810 that are illustrated in FIGS. 13 and 24 may not be included, and the enlargement factor Pa, the brightness gradient calculating parameter Pb, the contour extraction threshold value Pc, the contour correcting parameter Pd, and the block determining parameter Pe may be predetermined. Instead of the brightness gradient calculating parameter Pb, the coefficients of the Sobel filter may be predetermined.

The image subtracting unit 603 calculates the residual component 606 of the input image 604 and the high-resolution image (image having the same resolution as that of the input image 604) output by the enlarged image generating unit 602. A pixel value of the pixel at the coordinates (x, y) in the input image 604 is defined as I1(x, y). A pixel value of the pixel at the coordinates (x, y) in a high-resolution image that is generated by the enlarged image generating unit 602 is defined as I2(x, y). The image subtracting unit 603 calculates I2(x, y)−I1(x, y), for each of the corresponding pixels (that is, each of the pixels at the same coordinates) of the input image 604 and the high-resolution image enlarged and output by the enlarged image generating unit 602. This calculation result is the residual component 606. The residual component is data that indicates the difference of the pixel values between the corresponding pixels of the high-resolution image and the input image 604.

When the low-pass downsampling unit 601 transmits the low-resolution image 605, the image subtracting unit 603 transmits the residual component 606 together with the low-resolution image 605. The data where the low-resolution image 605 and the residual component 606 are matched is the compression data 607.

The image compressing apparatus 600 has the above configuration. If the input image 604 is input to the low-pass downsampling unit 601 and the image subtracting unit 603, the low-pass downsampling unit 601 downsamples the input image 604 and generates the low-resolution image 605. The enlarged image generating unit 602 enlarges the low-resolution image 605 and the image subtracting unit 603 calculates the residual component 606 of the obtained enlarged image and the input image. The low-pass downsampling unit 601 transmits the low-resolution image 605 to the image extending apparatus 610 and the image subtracting unit 603 transmits the low-resolution image 605 and the residual component 606 to the image extending apparatus 610.

The image extending apparatus 610 includes an enlarged image generating unit 611 and an image adding unit 612.

The image extending apparatus 610 extracts the low-resolution image 605 and the residual component 606 from the received compression data 607.

The low-resolution image 605 of the received compression data 607 is input to the enlarged image generating unit 611. The enlarged image generating unit 611 receives the low-resolution image 605 and enlarges the low-resolution image 605 to an image having the same resolution as that of the input image 604. The enlarged image generating unit 611 executes an image process for sharpening the contour of the enlarged image and outputs the obtained image to the image adding unit 612. This process is the same as the process executed by the image processing system including the interpolation image generating unit 101 according to the modification of the first embodiment or the image processing system including the interpolation image generating unit 101 according to the modification of the second embodiment.

The enlarged image generating unit 611 that is included in the image extending apparatus 610 is the same as the enlarged image generating unit 602 included in the image compressing apparatus 600, and is realized by the image processing system (refer to FIG. 13) including the interpolation image generating unit 101 according to the modification of the first embodiment. Further, the enlarged image generating unit 611 may be realized by the image processing system (refer to FIG. 24) including the interpolation image generating unit 101 according to the modification of the second embodiment.

The residual component 606 of the received compression data 607 is input to the image adding unit 612. The image adding unit 612 adds the enlarged image output by the enlarged image generating unit 611 and the residual component 606. A pixel value of the pixel at the coordinates (x, y) in the enlarged image is defined as I3(x, y). A pixel value of the pixel at the coordinates (x, y) in the residual component 606 is defined as I4(x, y). The image adding unit 612 calculates I3(x, y)+I4(x, y) for each of the corresponding pixels (that is, for each of the pixels at the same coordinates) of the enlarged image generated by the enlarged image generating unit 611 and the residual component 606, and generates a desired high-resolution extended image 615.

The image extending apparatus 610 has the above configuration. If the low-resolution image 605 is input to the enlarged image generating unit 611, the enlarged image generating unit 611 enlarges the low-resolution image 605. The image adding unit 612 adds the obtained enlarged image and the residual component 606 and generates the extended image 615.

When the low-resolution image 605 and the residual component 606 are transmitted to the image extending apparatus 610 through the transmission path 620, the image compressing apparatus 600 may further compress the low-resolution image 605 and the residual component 606 (compression data 607) using an existing data compressing method. In this case, the image extending apparatus 610 may extend the data using a data extending method corresponding to the existing data compressing method and execute the above process.

According to the third embodiment, the image extending apparatus 610 can generate a high-quality enlarged image from the low-resolution image 605 and the residual component 606 received from the image compressing apparatus 600 using the image enlarging process described in the first embodiment or the second embodiment. Since the enlarged image that is generated by the image enlarging process described in the first embodiment or the second embodiment is an image that is equal to the input image rather than the enlarged image generated by the existing image enlarging process, the data amount of the residual component 606 becomes the smaller data amount. As a result, the image compressing apparatus 600 can reduce the data amount of the residual component 606 that is transmitted through the transmission path 620.

In the above-described embodiments, the configuration where the brightness gradient calculating unit specifies the plural pixels whose arrangement becomes the same arrangement as the coefficients of the edge detection operator based on the calculation object pixel of the brightness gradient strength and the brightness gradient direction, calculates the products with the corresponding edge detection operator coefficients for the individual specified pixels, calculates the sum of the products to calculate the brightness gradients of the horizontal direction and the vertical direction, sets the magnitude of the synthesis vector of the vector whose magnitude is the brightness gradient of the horizontal direction and the vector whose magnitude is the brightness gradient of the vertical direction as the brightness gradient strength of the calculation object pixel, and sets arctangent of the result obtained by dividing the brightness gradient of the vertical direction by the brightness gradient of the horizontal direction as the brightness gradient direction, and the contour extracting unit selects the determination object pixel on whether the corresponding pixel is the pixel indicating the contour and determines the determination object pixel as the pixel indicating the contour, when the brightness gradient strength of the determination object pixel is more than the contour extraction threshold value and more than the brightness gradient strength of the adjacent pixel of the determination object pixel in the brightness gradient direction and the brightness gradient strength of the adjacent pixel in the direction of when the brightness gradient direction rotates by 180°, is described.

Further, the configuration where the image processing system includes the parameter setting unit that determines the brightness gradient calculating parameter to select the coefficients of the edge detection operators, the contour extraction threshold value, and the distance to specify the first isolation pixel and the second isolation pixel, from the enlargement factor from the image before the enlargement to the interpolation image, the brightness gradient calculating unit previously holds the edge detection operator coefficients of the plural kinds and calculates the brightness gradient strength and the brightness gradient direction using the coefficients of the edge detection operator according to the brightness gradient calculating parameter, and the contour extracting unit specifies the pixel indicating the contour, using the contour extraction threshold value determined by the parameter setting unit, and the contour correcting unit specifies the first isolation pixel and the second isolation pixel using the distance determined by the parameter setting unit is described.

Further, the configuration where the parameter setting unit determines the brightness gradient calculating parameter, the contour extraction threshold value, and the distance to specify the first isolation pixel and the second isolation pixel, from the enlargement factor input to the parameter setting unit, is described.

Further, the configuration where the parameter setting unit determines the brightness gradient calculating parameter, the contour extraction threshold value, and the distance to specify the first isolation pixel and the second isolation pixel, from the predetermined enlargement factor, is described.

Further, the configuration where the interpolation image generating unit receives the enlargement object image, inserts the pixels between the pixels of the enlargement object image, and generates the interpolation image obtained by enlarging the enlargement object image is included is described.

The present invention has been described with reference to the embodiments, but the present invention is not limited to the embodiments. In the configuration and the details of the present invention, various changes that can be understood by those skilled in the art can be made within the scope of the present invention.

The present invention can be applied to an image processing system that executes an image process to sharpen the contour of an image enlarged from a low-resolution still image or a moving image, and can be applied to a system that compresses and transmits a high-resolution still image or a moving image or stores the high-resolution still image or the moving image.

This application claims the benefit of priority based on Japanese Patent Application No. 2007-332029, filed on Dec. 25, 2007, the disclosure of which is hereby incorporated by reference in its entirety.

The invention claimed is:

1. An image processing apparatus, comprising:
a brightness gradient calculating unit that calculates brightness gradient strength and a brightness gradient direction in each pixel of an interpolation image corresponding to an enlarged image including pixels inserted between pixels of an image before enlargement;
a contour extracting unit that determines a pixel indicating the contour in said interpolation image, using said brightness gradient strength and said brightness gradient direction; and
a contour correcting unit that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of said first isolation pixel among the pixels between said first isolation pixel and said second isolation pixel with a color of said second isolation pixel.

2. The image processing apparatus as claimed in claim 1, wherein said brightness gradient calculating unit specifies a plurality of pixels whose arrangement becomes the same arrangement as coefficients of an edge detection operator based on a calculation object pixel of said brightness gradient strength and said brightness gradient direction, calculates products with the corresponding edge detection operator coefficients for the individual specified pixels, calculates a sum of the products to calculate brightness gradients of a horizontal direction and a vertical direction, sets the magnitude of a synthesis vector of a vector whose magnitude is the brightness gradient of said horizontal direction and a vector whose magnitude is the brightness gradient of the vertical direction as the brightness gradient strength of said calculation object pixel, and sets arctangent of a result obtained by dividing the brightness gradient of said vertical direction by the brightness gradient of said horizontal direction as the brightness gradient direction, and
said contour extracting unit selects a determination object pixel on whether the corresponding pixel is the pixel indicating the contour, and determines that said determination object pixel is the pixel indicating the contour, when said brightness gradient strength of said determination object pixel is more than a contour extraction threshold value and more than the brightness gradient strength of the adjacent pixel of said determination object pixel in said brightness gradient direction and the brightness gradient strength of the adjacent pixel in a 180°-rotation direction of said direction.

3. The image processing apparatus as claimed in claim 2, further comprising:
a parameter setting unit that determines a brightness gradient calculating parameter to select the coefficients of the edge detection operator, said contour extraction threshold value, and the distance to specify the first isolation pixel and the second isolation pixel, from an enlargement factor from said image before the enlargement to said interpolation image,
wherein said brightness gradient calculating unit previously holds the edge detection operator coefficients of a plurality of kinds and calculates said brightness gradient strength and said brightness gradient direction using the edge detection operator coefficients according to said brightness gradient calculating parameter,
said contour extracting unit specifies the pixel indicating said contour using said contour extraction threshold value determined by said parameter setting unit, and
said contour correcting unit specifies said first isolation pixel and said second isolation pixel using said distance determined by said parameter setting unit.

4. The image processing apparatus as claimed in claim 3, wherein said parameter setting unit determines said brightness gradient calculating parameter, said contour extraction threshold value, and the distance to specify said first isolation pixel and said second isolation pixel, from the enlargement factor input to the parameter setting unit.

5. The image processing apparatus as claimed in claim 3, wherein said parameter setting unit determines said brightness gradient calculating parameter, said contour extraction threshold value, and the distance to specify said first isolation pixel and said second isolation pixel, from the predetermined enlargement factor.

6. The image processing apparatus of claim 1, further comprising
an interpolation image generating unit that receives an enlargement object image, inserts pixels between pixels of the enlargement object image, and generates said interpolation image where said enlargement object image is enlarged.

7. An image compressing apparatus, comprising:
a downsampling unit that downsamples an input image and generates a low-resolution image having resolution lower than resolution of said input image;
an enlarged image generating unit that enlarges said low-resolution image; and
an image subtracting unit that calculates differential data corresponding to the difference of pixel values between corresponding pixels of said input image and the image enlarged by said enlarged image generating unit,
wherein said enlarged image generating unit includes
an interpolation image generating unit that inserts pixels between pixels of an enlargement object image and generates an interpolation image where said enlargement object image is enlarged,
a brightness gradient calculating unit that calculates brightness gradient strength and a brightness gradient direction in each pixel of the interpolation image,
a contour extracting unit that determines a pixel indicating the contour in said interpolation image, using said brightness gradient strength and said brightness gradient direction, and
a contour correcting unit that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of said first isolation pixel among the pixels between said first isolation pixel and said second isolation pixel with a color of said second isolation pixel.

8. The image compressing apparatus as claimed in claim 7, wherein said brightness gradient calculating unit specifies a plurality of pixels whose arrangement becomes the same arrangement as coefficients of an edge detection operator based on a calculation object pixel of said brightness gradient strength and said brightness gradient direction, calculates products with the corresponding edge detection operator coefficients for the individual specified pixels, calculates a sum of the products to calculate brightness gradients of a horizontal direction and a vertical direction, sets the magnitude of a synthesis vector of a vector whose magnitude is the brightness gradient of said horizontal direction and a vector whose magnitude is the brightness gradient of the vertical direction as the brightness gradient strength of said calculation object pixel, and sets arctangent of a result obtained by dividing the brightness gradient of said vertical direction by the brightness gradient of said horizontal direction as the brightness gradient direction, and
said contour extracting unit selects a determination object pixel on whether the corresponding pixel is the pixel indicating the contour, and determines that said determination object pixel is the pixel indicating the contour, when said brightness gradient strength of said determination object pixel is more than a contour extraction threshold value and more than said brightness gradient strength of the adjacent pixel of said determination object pixel in the brightness gradient direction and said brightness gradient strength of the adjacent pixel in a 180°-rotation direction of said direction.

9. An image transmitting system, comprising:
an image compressing apparatus; and
an image extending apparatus,
wherein said image compressing apparatus includes
a downsampling unit that downsamples an input image to generate a low-resolution image having resolution lower than resolution of said input image, and transmits said low-resolution image to said image extending apparatus,
a first enlarged image generating unit that enlarges said low-resolution image, and
an image subtracting unit that calculates differential data corresponding to the difference of pixel values between corresponding pixels of said input image and the image enlarged by said first enlarged image generating unit and transmits said differential data to said image extending apparatus,
said image extending apparatus includes
a second enlarged image generating unit that enlarges the low-resolution image received from said image compressing apparatus, and
an image adding unit that calculates a sum of pixel values of corresponding pixels of the image enlarged by said second enlarged image generating unit and the differential data received from said image compressing apparatus, and
each of said first enlarged image generating unit and said second enlarged image generating unit includes
an interpolation image generating unit that inserts pixels between pixels of an enlargement object image and generates an interpolation image where said enlargement object image is enlarged,
a brightness gradient calculating unit that calculates brightness gradient strength and a brightness gradient direction in each pixel of the interpolation image, a contour extracting unit that determines a pixel indicating the contour in said interpolation image, using said brightness gradient strength and said brightness gradient direction, and a contour correcting unit that specifies a first isolation pixel isolated by the predetermined distance from each pixel indicating the contour in a brightness gradient direction of the pixel indicating the contour and a second isolation pixel isolated by said predetermined distance from each pixel in a 180°-rotation direction of said direction, for each pixel indicating the contour, corrects colors of the pixels between the pixel indicating said contour and said first isolation pixel with a color of said first isolation pixel, and corrects the colors of the pixels whose colors are not corrected with the color of said first isolation pixel among the pixels between said first isolation pixel and said second isolation pixel with a color of said second isolation pixel.

* * * * *